United States Patent
Toyohara et al.

(10) Patent No.: US 6,448,461 B1
(45) Date of Patent: Sep. 10, 2002

(54) METHOD FOR TREATING BORON-CONTAINING WASTE

(75) Inventors: Masumitsu Toyohara, Yokohama; Tatsuaki Sato, Tokyo-To; Tetsuya Noda; Noriko Suzuki, both of Yokohama; Yoshinari Takamatsu, Kawasaki, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/493,174

(22) Filed: Jan. 28, 2000

(30) Foreign Application Priority Data

Jan. 29, 1999 (JP) .......................................... 11-021134

(51) Int. Cl.$^7$ ................................................ G21F 9/16
(52) U.S. Cl. ........................................ 588/12; 588/252
(58) Field of Search ........................... 588/1, 2, 3, 4, 588/12, 249, 252; 210/749, 751

(56) References Cited

U.S. PATENT DOCUMENTS 4,504,317 A * 3/1985 Smeltzer et al. ............. 106/90
5,732,363 A * 3/1998 Suzuki et al. ................. 588/4

* cited by examiner

Primary Examiner—Steven P. Griffin
Assistant Examiner—Eileen E. Nave
(74) Attorney, Agent, or Firm—Foley & Lardner

(57) ABSTRACT

The present invention provides a method and an apparatus for treating boron-containing waste, which prevent clogging of a waste liquid line, achieve an increase in feeding of a waste liquid to a dryer, make in-drum mixing feasible, and increase the strength of a cement solidification product. A method for treating a boron-containing waste liquid comprises the step of adding an alkali metal element compound and an alkali earth metal element compound to the boron-containing waste liquid, and the step of then drying and powdering the boron-containing waste liquid, wherein the temperature of the boron-containing waste liquid during a period from addition of either the alkali metal element compound or the alkali earth metal element compound until the drying and powdering is maintained at not lower than the precipitation temperature of a compound containing boron and an alkali metal and a compound containing boron and an alkali earth metal.

12 Claims, 13 Drawing Sheets

METHOD FOR TREATING BORON-CONTAINING WASTE

TECHNICAL FIELD

The present invention relates to a method and an apparatus for treating boron-containing waste. More particularly, the invention relates to a method for treating medium to low level boron-containing radioactive waste which occurs as a result of operation, modification or dismantling of a nuclear power plant or the like, and an apparatus for treating boron-containing radioactive waste.

PRIOR ART

Boron-containing waste is discharged from facilities which handle various types of radioactive substances, such as pressurized water reactor (PWR) type power plants. Since such waste (e.g., concentrated waste liquid) contains boric acid containing a radioactive nuclide, its components need to be finally fixed by cement or the like. However, boric acid hinders solidification of cement, thus restricting the amount of boric acid which can be added into cement. For example, the weight of boric acid that can be solidified per cement solidification product with a volume of 200 liters is only about 10 kg, thus posing the problem of an enormous amount of the solidified waste. The mechanism of hindrance to cement solidification by boric acid may be that Ca, a main component of cement, reacts with boric acid in the waste liquid to form a calcium borate film, which covers the surface of cement particles, thereby terminating the progress of a hydration reaction.

A method proposed to decrease the amount of solidified waste is to insolubilize boric acid contained in the concentrated waste liquid so that the boric acid will not react when mixed with cement. An example is to add a calcium compound into the concentrated waste liquid to convert boric acid into insoluble calcium borate. Japanese Unexamined Patent Publication No. 59-12399 discloses a method which comprises adding a calcium compound, such as calcium hydroxide, to a concentrated waste liquid of about 70° C., aging the mixture at a temperature of 40° C. or lower to precipitate particles of calcium borate, separating the precipitated particles, and solidifying the liquid with cement. This method can reduce the amount of the resulting solidified waste to one-third to one-seventh of the corresponding amount produced by mere mixing of a concentrated waste liquid with cement for solidification. Japanese Unexamined Patent Publication No. 59-18498 discloses a method of drying the aged precipitate by a dryer to form a powder, and solidifying the powder. Japanese Unexamined Patent Publication No. 10-132997 discloses a method comprising powdering a high temperature slurry of concentrated waste liquid by means of a dryer to increase the strength of the resulting cement solidification product and decrease the amount of solidified waste. A proposal has been made, therefore, for the use of a vertical thin film dryer having a very high efficiency of heat transfer and capable of simplified instrument layout.

However, these methods involve the problem that a waste liquid line (especially, a curved portion of piping leading to the dryer, flowmeter, pumped portion, connectors) is clogged due to the sedimentation and buildup of calcium borate. In kneading precipitated calcium borate with cement, it is desired to apply a method of kneading in a radioactive waste solidifying reservoir, so-called in-drum mixing, from the point of view of reducing equipment cost and operating cost. Because of poor kneading due to high viscosity of the kneaded materials, however, powder remains unchanged, thus making this method unfeasible. Even if a driving force is increased in in-drum mixing to enhance a kneading power, kneaded materials are accommodated to a capacity of only 60 to 70% of a storage reservoir, out of considerations for scattering and vorticity of the kneaded materials. As a result, the amount of waste formed increases. Hence, there was no choice but to use a dedicated kneader, thereby increasing equipment cost and operating cost.

The present invention aims to solve the above-mentioned problems. It is an object of this invention to provide a method and an apparatus for treating a boron-containing waste liquid, the method and apparatus preventing clogging of a waste liquid line and achieving an increase in feeding of a waste liquid. It is another object of the invention to provide a method and an apparatus for treating a boron-containing powder, the method and apparatus making in-drum mixing feasible by lowering viscosity of a boron-containing powder and a cementitious powder when kneaded, and the method and apparatus increasing the strength of a cement solidification product.

DISCLOSURE OF THE INVENTION

The inventors of this invention found that clogging of a waste liquid line could be prevented and the feedability of a boron-containing waste liquid to a dryer could be improved, by adding not only an alkali earth metal element compound, but also an alkali metal element compound to the waste liquid, and maintaining the mixture at a high temperature. This finding led them to accomplish the invention. The inventors also found that a boron-containing powder obtained by a method, such as the method of the invention, could lower viscosity during kneading with a cementitious powder containing a chemical admixture, make in-drum mixing feasible, and enhance the strength of a cement solidification product. This finding led to the invention.

Therefore, a method for treating a boron-containing waste liquid according to the invention comprises the steps of adding an alkali metal element compound, and an alkali earth metal element compound to the boron-containing waste liquid, and then drying and powdering the boron-containing waste liquid, wherein a temperature of the boron-containing waste liquid during a period from addition of either the alkali metal element compound or the alkali earth metal element compound until the drying and powdering is maintained at not lower than a precipitation temperature of a compound containing boron and an alkali metal and a compound containing boron and an alkali earth metal.

A method for treating boron-containing waste according to the invention is characterized by kneading and solidifying a powder containing boron, an alkali metal and an alkali earth metal, a cementitious solidifying material, a chemical admixture for improving fluidity of cement, and water.

An apparatus for treating a boron-containing waste liquid according to the invention comprises means for storing the boron-containing waste liquid, means for supplying an alkali metal element compound to the boron-containing waste liquid, means for supplying an alkali earth metal element compound to the boron-containing waste liquid, means for drying and powdering the boron-containing waste liquid, and means for adjusting a temperature of the boron-containing waste liquid.

An apparatus for treating boron-containing waste according to the invention comprises means for supplying a powder containing boron, an alkali metal, and an alkali earth metal to a kneading container, means for supplying a cementitious solidifying material to the kneading container, means for supplying a chemical admixture for improving fluidity of cement to the kneading container, means for supplying water to the kneading container, and means for kneading the boron-containing powder, the cementitious solidifying material, the chemical admixture, and the water in the kneading container.

BEST MODE FOR CARRYING OUT THE INVENTION

Figure 1:
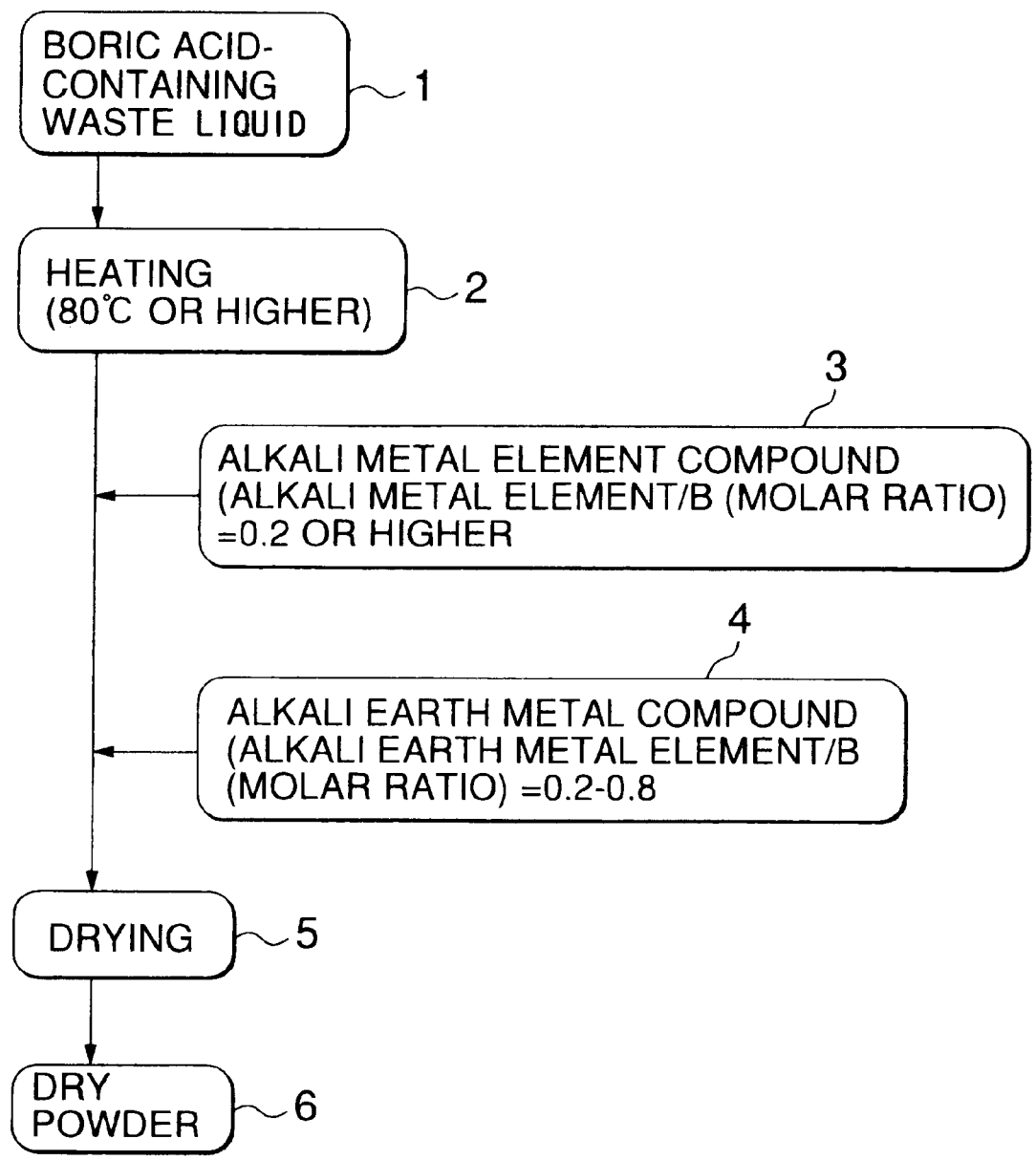
FIG. 1 is a flow chart showing a method for treating a boron-containing waste liquid according to the present invention.

Method for Treating Waste Liquid (Boron-containing Waste Liquid)

A boron-containing waste liquid to be treated by a method for treating a waste liquid according to the invention is not restricted. Typically, it is a waste liquid containing boric acid which occurs in radioactive substance handling facilities.

(Alkali Metal Element Compound)

The method for treating a waste liquid according to the invention is characterized by adding an alkali metal element compound. The amount of the alkali metal element compound after addition is preferably 0.2 or more, more preferably 0.2 to 0.5 when expressed as molar ratio to boron. The boron-containing waste liquid to be treated may contain an alkali metal element compound if added before waste liquid treatment. In this case, if the molar ratio of the alkali metal element compound is preferably 0.2 or more relative to boron, there may be no need to add the alkali metal element compound anew. The invention includes such a case.

Examples of the alkali metal compound are hydroxides, sulfuric acid compounds and nitric acid compounds of sodium, and hydroxides, sulfuric acid compounds and nitric acid compounds of potassium.

In adding an alkali earth metal element compound, such as that of calcium, to the boron-containing waste liquid, the addition of a compound of an alkali metal, such as sodium, inhibits sedimentation of a precipitate, and diminishes the possibility for clogging of piping. The addition of the alkali metal compound can be expected not only to prevent sedimentation, but also to decrease the amount of the resulting waste and improve the physical properties of the solidification product. The reasons may be that the addition of the alkali metal compound increases the viscosity and density of the waste liquid, and because of the presence of alkali metal compound ions, the surface potential of precipitate particles increases, thereby causing the particles to repel each other.

(Alkali Earth Metal Element Compound)

The method for treating a waste liquid according to the invention is characterized by adding an alkali earth metal element compound. The amount of the alkali earth metal element compound after addition is preferably 0.2 to 0.8, more preferably 0.2 to 0.7 when expressed as molar ratio to boron.

After an alkali metal element compound is added and dissolved in the waste liquid, the alkali earth metal compound may be added and dissolved in the waste liquid. This is preferred from the aspect of the effect of suppressing the sedimentation of a precipitate.

Examples of the alkali earth metal compound are hydroxides, sulfuric acid compounds and nitric acid compounds of calcium, and hydroxides, sulfuric acid compounds and nitric acid compounds of magnesium.

(Step of Drying and Powdering)

The method for treating a waste liquid according to the invention includes the drying and powdering step. Preferably, this drying step is performed using a dryer, more preferably, a vertical type thin film dryer.

(Temperature of Boron-containing Waste Liquid)

In the invention, during a period from addition of either the alkali metal element compound or the alkali earth metal element compound until the drying and powdering, the temperature of the boron-containing waste liquid is maintained at not lower than the precipitation temperature (aging temperature) of a compound of boron with an alkali metal, and at not lower than the precipitation temperature (aging temperature) of a compound of boron with an alkali earth metal. Preferably, the temperature of the boron-containing waste liquid is maintained at 60° C. or higher, more preferably at 80° C. or higher. By so maintaining the temperature at a high level, it becomes possible to prevent sedimentation in a low flow velocity portion present in piping, an increase in resistance due to adhesion to the piping, and clogging of the piping, which are phenomena occurring because calcium borate precipitate dispersed in the waste liquid is aged and grown to gigantic particles.

(Flow Chart of a Preferred Embodiment)

FIG. 1 is a flowchart for explaining a preferred embodiment of the method for treating a boron-containing waste liquid according to the invention. In this embodiment, a radioactive boric acid-containing waste liquid 1 consisting essentially of boric acid, which occurs in a nuclear power plant or the like, is heated to a temperature of 80° C. or higher (step 2). Then, an alkali metal element compound 3, such as that of Na or K, is added to neutralize the waste liquid 1. Further, an alkali earth metal compound 4, such as that of Ca or Mg, is added to insolubilize boric acid, the essential component. The waste liquid containing the resulting insoluble boric acid compound (insoluble borate waste liquid) is supplied to a dryer, with the above-mentioned temperature being maintained, for drying (step 5). As a result, the volume of waste liquid is reduced as a dry powder 6. The dry powder 6 can be solidified together with a cementitious solidifying material.

Method for Treating Boron-containing Waste (Powder)

(Treatment of Boron-containing Waste)

A powder of boron-containing waste according to the invention contains an alkali metal and an alkali earth metal. For example, it is a powder comprising calcium borate and sodium borate, preferably, an alkaline powder. The invention is characterized by combining this powder, cement, and a chemical admixture for improving the fluidity of cement. Because of this combination, the invention enables the effect of the chemical admixture to be fully exhibited to an unexpected degree, as contrasted with conventional boron-containing waste which has been unable to fully obtain the viscosity lowering effect of a chemical admixture. This combination increases the fluidity of the boron-containing waste and the cementitious solidifying material when kneaded, permits kneading under very mild conditions, and eventually enables in-drum mixing. The combination also has the effect of raising the strength of cement after solidification.

(Boron-containing Powder)

In a preferred embodiment of the invention, a powder to be treated is a boron-containing powder which has been obtained by the aforementioned method for treating the boron-containing waste liquid. According to this method, the effect of increasing fluidity during kneading, and the effect of improving physical properties after solidification are enhanced, preferably, by supplying the waste liquid, heated at 80° C. or higher, to a dryer. Even if the temperature of the waste liquid lowers in a situation in which operation is interrupted midway, e.g., end of a daily shift or during lunch break, or because of a trouble, the above effects are noticed when the waste liquid is heated again to 80° C. or higher.

The cementitious solidifying material may be accommodated beforehand in a waste storage container, and admitted into solidifying facilities. In this case, there is no need to perform tasks in a radiation control area. Nor is there need to install instruments, such as hopper or batcher, in the control area. Thus, the volume of the building can be reduced, and the cost for radioactive waste disposal can be decreased markedly. To add the dry powder to the waste storage container, a dedicated metering tank and a dedicated metering machine may be used. However, it is also possible to perform control by measuring the weight of the waste storage container. This produces the effect of omitting the metering tank and metering machine.

(Cementitious Solidifying Material)

A cementitious solidifying material to be used in solidifying the boron-containing waste in the invention is not restricted. Its examples are portland cement alone, a mixture of portland cement and blast furnace slag, and a mixture of portland cement and fly ash.

In supplying the cementitious solidifying material, there may be employed, for example, a method of supplying the cementitious solidifying material into a waste storage container from a cementitious solidifying material silo installed in radioactive waste disposal equipment, and a method of supplying the cementitious solidifying material, in an amount necessary for solidification, beforehand into a waste storage container. Preferably, in this case, the cementitious solidifying material in the waste storage container is weighed and added in facilities other than the radioactive waste disposal equipment, and then brought into the radioactive waste disposal facilities. When the cementitious solidifying material is accommodated in the waste storage container beforehand, and taken into the solidifying facilities, there is no need to perform tasks in a radiation control area. Nor is there need to install instruments, such as hopper or batcher, in the control area. Thus, the volume of the building can be reduced, and the cost for radioactive waste disposal can be decreased markedly.

(Chemical Admixture for Improving Fluidity of Cement)

The chemical admixture for improving the fluidity of cement may be one used generally. Preferred examples are sodium phosphate, potassium carbonate, phosphate glass, lignin sulfonic acid, carboxylic acid, and naphthalene-sulfonic acid formaldehyde, which have a fluid improving effect even for the powder converted to alkaline particles by pretreating boric acid with the alkali metal element compound and the alkali earth metal element compound.

This chemical admixture may be used in an amount of 0.5 part by weight or more for 100 parts by weight of the cementitious solidifying agent, whereby in-drum mixing can be performed preferably.

(Kneading)

In the invention, kneading of the cementitious solidifying material and the boron-containing waste is typically performed in a storage container for waste, but their kneading in a container or device other than the waste storage container is not ruled out. There is no restriction on the waste storage container, which may be a metal drum, for example.

(Procedure)

The procedure for kneading of the cementitious solidifying material and the boron-containing waste in the invention is not restricted. Preferably, the cementitious solidifying material, the chemical admixture for improving the fluidity of cement, and water are kneaded to prepare a cement slurry. The boron-containing waste (powder) is charged into the cement slurry, and then cement is solidified. More preferably, the chemical admixture and the cementitious solidifying material are mixed in advance, and then kneading is carried out. By this procedure, viscosity of the slurry is made very low, and the chemical admixture is dissolved in the slurry homogeneously and easily.

Apparatus for Treating Waste Liquid (Apparatus for Treating Boron-containing Waste Liquid)

An apparatus for treating a boron-containing waste liquid according to the invention comprises, at least, means for storing the boron-containing waste liquid, means for supplying an alkali metal element compound to the boron-containing waste liquid, means for supplying an alkali earth metal element compound to the boron-containing waste liquid, means for drying and powdering the boron-containing waste liquid, and means for adjusting the temperature of the boron-containing waste liquid.

(Means for Storing Boron-containing Waste Liquid)

The means for storing a boron-containing waste liquid according to the invention may be any container capable of storing a boron-containing waste liquid. An example is a waste liquid tank for storing a boric acid waste liquid generated in radioactive substance handling facilities. Preferred examples are those on which various means to be described below are mounted.

(Means for Supplying Alkali Metal Compound)

In the invention, the means for supplying an alkali metal compound is not restricted, and may be a mere container for storing an alkali metal compound. Preferably, it is an alkali metal element compound tank connected to the waste liquid tank.

(Means for Supplying Alkali Earth Metal Compound)

In the invention, the means for supplying an alkali earth metal compound is not restricted, and may be a mere container for storing an alkali earth metal compound. Preferably, it is an alkali earth metal element compound tank connected to the waste liquid tank.

(Means for Drying and Powdering Boron-containing Waste Liquid)

In the invention, the means for drying and powdering a boron-containing waste liquid is not restricted, and may be a batch type dryer. Preferably, it is a dryer connected to a waste liquid line, more preferably, a vertical thin film dryer.

(Means for Adjusting Temperature of Boron-containing Waste Liquid)

In the invention, the means for adjusting the temperature of a boron-containing waste liquid is not restricted. It may be a method of performing temperature adjustment from outside the storage means or the waste liquid line, a method of heating the entire atmosphere, or a method of inserting temperature adjusting means into the waste liquid. Preferably, it is a temperature controller which inserts a heater into the boron-containing waste liquid to control the temperature of the waste liquid.

(Waste Liquid Line)

In the invention, a waste liquid line is not absolutely necessary. Preferably, however, the boron-containing waste liquid tank and the dryer are connected together by a waste liquid line. This waste liquid line is preferably connected parallel to, or with a downward slope relative to, a horizontal surface until it is connected to the dryer. The waste liquid line is also formed to have the same bore, or an increasing bore toward the dryer, until it enters the dryer. By so doing, stagnation of the waste liquid can be eliminated to prevent sedimentation and clogging of the piping with high efficiency.

In the waste liquid line that can be provided in the invention, it is further preferred to provide at least one of a flowmeter, a temperature controller (heater), a liquid feed pump, and a vibrator. Of these devices, the flowmeter is preferably an instrument for noncontactly measuring the flow rate of waste liquid flowing out of the waste liquid tank, and more preferably, an electromagnetic flowmeter. The liquid feed pump is preferably a screw pump, and the vibrator is preferably an ultrasonic oscillator. Preferably, the temperature controller (heater) is of a type which forms no unevennesses in the waste liquid line. These instruments are effective in dispersing the precipitate stably in the waste liquid to suppress sedimentation and prevent clogging in the piping. The provision of the vibrator for giving vibrations to the waste fluid, in particular, is effective in increasing dispersibility of the precipitate to prevent gigantism of particles, or to redisperse the precipitated particles in the fluid. In this manner, an electromagnetic flowmeter and a screw pump are adopted so that the structures of the flowmeter and pump will not create resistance in the fluid passageway. This measure can prevent gigantism of the precipitate due to aging, disperse particles in the fluid to avoid sedimentation, and further redisperse the precipitated particles in the fluid, thereby making it possible to provide an apparatus for treating a boron-containing waste liquid, the apparatus being free from clogging of piping and having very high reliability.

Apparatus for Treating Boron-containing Waste (Apparatus for Treating Boron-containing Waste)

An apparatus for treating boron-containing waste (solid, preferably, powdery) according to the invention comprises, at least, means for supplying a powder containing boron, an alkali metal, and an alkali earth metal to a kneading container, means for supplying a cementitious solidifying material to the kneading container, means for supplying a chemical admixture for improving fluidity of cement to the kneading container, means for supplying water to the kneading container, and means for kneading the boron-containing powder, the cementitious solidifying material, the chemical admixture, and the water in the kneading container. These means will be described below.

(Means for Supplying Boron-containing Powder)

In the invention, the means for supplying a powder containing boron, an alkali metal, and an alkali earth metal (a boron-containing powder) is not restricted. Preferably, however, it is a storage tank for storing the boron-containing powder, more preferably, that having a discharge port in a lower portion.

(Means for Supplying Cementitious Solidifying Material)

In the invention, the means for supplying a cementitious solidifying material is not restricted. Preferably, however, it is a storage tank for storing the cementitious solidifying material, more preferably, that having a discharge port in a lower portion.

(Means for Supplying Chemical Admixture)

In the invention, the means for supplying a chemical admixture is not restricted. Preferably, however, it is a storage tank for storing the chemical admixture, more preferably, that having a discharge port in a lower portion.

(Means for Supplying Water)

In the invention, the means for supplying water is not restricted, so long as it is one in common use.

(Kneading Container)

In the invention, the kneading container is not restricted, and may be a dedicated kneading container. Preferably, it is a waste storage container itself, e.g., a metal drum.

(Kneading Means)

In the invention, the kneading means is not restricted, and the use of a dedicated kneader is not ruled out. Preferably, it is a kneading vane which is capable of in-drum mixing and which is used to knead a substance in a waste storage container.

(Means for Forming a Boron-containing Powder)

The means for forming a boron-containing powder in the treatment of boron-containing waste according to the invention may, for example, comprise means for storing a boron-containing waste liquid, means for supplying an alkali metal element compound to the boron-containing waste liquid, means for supplying an alkali earth metal element compound to the boron-containing waste liquid, means for drying and powdering the boron-containing waste liquid, and means for adjusting the temperature of the boron-containing waste liquid, as stated earlier. If the production of cement solidification product is included, the means for forming the boron-containing powder may, for example, comprise, at least, a waste liquid tank for storing a boric acid waste liquid generated in radioactive substance handling facilities, an alkali metal element compound tank connected to the waste liquid tank, an alkali earth metal compound tank connected to the waste liquid tank, a temperature controller for heating the boric acid waste liquid and controlling its temperature, a waste liquid line connected to the waste liquid tank, a vertical thin film dryer for receiving a solution from the tank, a flowmeter, a heater and a liquid feed pump provided on the waste liquid line connecting this dryer to the waste liquid tank, a storage tank for storing a dry powder generated in the dryer, a radioactive waste storage container for receiving the dry powder from the storage tank, a storage tank for addition of a chemical admixture, and a kneading vane for kneading a substance in the waste storage container.

EXAMPLES

Embodiments of the invention will be described using the attached drawings.

Treatment of Boron-containing Waste Liquid

FIG. 1 is a flow chart for explaining an embodiment of the method for treating a boron-containing waste liquid according to the invention. In this embodiment, a radioactive boric acid-containing waste liquid 1 consisting essentially of boric acid, which occurs in a nuclear power plant or the like, is heated to a temperature of 80° C. or higher (step 2). Then, an alkali metal element compound 3, such as that of Na or K, is added to neutralize the waste liquid 1. Further, an alkali earth metal compound 4, such as that of Ca or Mg, is added to insolubilize boric acid, the essential component. The waste liquid containing the resulting insoluble boric acid compound (insoluble borate waste liquid) is supplied to a dryer, with the above-mentioned temperature being maintained, for drying (step 5). As a result, the waste liquid is volume reduced as a dry powder 6. The dry powder 6 is formed into a cement solidification product together with a cementitious solidifying material.

Next, test examples of the invention will be described.
(Test Example 1 of Waste Liquid Treatment—Test on a Laboratory Level)

<Test Example 1-1>

Boric acid was dissolved in water to a boron (B) concentration of 21,000 ppm, forming a simulated waste liquid. The simulated waste liquid was heated to 80° C., and then sodium hydroxide as an alkali metal element compound was added. Then, calcium hydroxide as an alkali earth metal compound was added to obtain an insoluble borate waste liquid.

The insoluble borate waste liquid was charged into a 100 ml graduated cylinder, and allowed to stand. The sedimentation ratio for the insoluble borate waste liquid sedimentation during this period was determined, with the Na/B molar ratio and the Ca/B molar ratio as parameters. The results are shown in Table 1. The period of time during which the insoluble borate waste liquid was allowed to stand (hereinafter referred to as "the standin time") was set at 60 minutes. During this standing time, the height of the upper surface of sediment was measured periodically. During the standing time, the waste liquid was held at a temperature of 80° C.

Table 1 shows the results at the standing time versus varied proportions of the additives in Test Examples 1 to 5 subdivided into 1 to 5 runs.

TABLE 1

| | Proportion of additive (molar ratio) | | Standing time (min) | | | | | | | | | | |
|---|---|---|---|---|---|---|---|---|---|---|---|---|---|
| No. | Na/B | Ca/B | 0 | 0.5 | 1 | 3 | 5 | 10 | 15 | 20 | 25 | 30 | 60 |
| 1 | | | | | | | | | | | | | |
| 1 | 0 | 0.1 | 100 | 70 | 12.7 | 11.3 | 11.3 | 11.3 | 11 | 10.8 | 10.8 | 10.8 | 9.5 |
| 2 | | 0.2 | 100 | 72.5 | 21.2 | 18.8 | 18.8 | 18.8 | 18 | 18 | 18 | 18 | 17.3 |
| 3 | | 0.4 | 100 | 72.7 | 26.5 | 23.5 | 23.5 | 22.5 | 22.5 | 22.5 | 22.5 | 22.5 | 21.6 |
| 4 | | 0.6 | 100 | 80.7 | 55.5 | 47.5 | 46.5 | 43.4 | 37.4 | 37.4 | 36.4 | 36.4 | 33.3 |
| 5 | | 0.8 | 100 | 81.2 | 57.2 | 45.7 | 45.7 | 41 | 39 | 37.1 | 35.2 | 35.2 | 33.3 |
| 2 | | | | | | | | | | | | | |
| 1 | 0.1 | 0.1 | 100 | 71.2 | 13 | 11.5 | 11.5 | 11.3 | 11.3 | 10.8 | 10.8 | 10.5 | 9.7 |
| 2 | | 0.2 | 100 | 72.2 | 20.8 | 19 | 19 | 18.8 | 18.5 | 18.3 | 18 | 18 | 17.3 |
| 3 | | 0.4 | 100 | 73 | 26.5 | 24 | 23.5 | 23.5 | 22.7 | 22.5 | 22.5 | 22.5 | 21.8 |
| 4 | | 0.6 | 100 | 79.8 | 57.8 | 48.5 | 46.5 | 43.8 | 39.7 | 38.5 | 38.2 | 38.3 | 35 |
| 5 | | 0.8 | 100 | 81.5 | 58.2 | 50.3 | 46.2 | 42.1 | 39.2 | 37 | 35.5 | 35.5 | 35.2 |
| 3 | | | | | | | | | | | | | |
| 1 | 0.2 | 0.1 | 100 | 71.4 | 13.2 | 12.1 | 11.9 | 11.4 | 11 | 10.8 | 10.8 | 10.8 | 10.7 |
| 2 | | 0.2 | 100 | 95 | 65.5 | 43.2 | 36.6 | 32.1 | 31.4 | 31.4 | 30.8 | 30.6 | 30.2 |

TABLE 1-continued

| | Proportion of additive (molar ratio) | | Standing time (min) | | | | | | | | | | |
|---|---|---|---|---|---|---|---|---|---|---|---|---|---|
| No. | Na/B | Ca/B | 0 | 0.5 | 1 | 3 | 5 | 10 | 15 | 20 | 25 | 30 | 60 |
| 3 | | 0.4 | 100 | 95.5 | 68.8 | 46.8 | 40.4 | 35 | 34.6 | 33.4 | 32.8 | 32.1 | 31 |
| 4 | | 0.6 | 100 | 95.5 | 73.6 | 58.3 | 53.5 | 48.9 | 45 | 43.8 | 43.2 | 42.8 | 42 |
| 5 | | 0.8 | 100 | 95.7 | 61.6 | 54.2 | 51.2 | 46.5 | 44.8 | 42.7 | 41.2 | 40 | 39.2 |
| 4 | | | | | | | | | | | | | |
| 1 | 0.35 | 0.1 | 100 | 71 | 13 | 11.7 | 11.7 | 11.5 | 11.5 | 11.5 | 11.3 | 11.3 | 10.5 |
| 2 | | 0.2 | 100 | 95.2 | 70.5 | 58.4 | 52.1 | 43.6 | 38 | 33.8 | 31.5 | 31.5 | 31.5 |
| 3 | | 0.4 | 100 | 96 | 72.3 | 62.3 | 56.8 | 48.3 | 42.1 | 39.5 | 37.8 | 36.6 | 35.4 |
| 4 | | 0.6 | 100 | 96.8 | 95.1 | 85.3 | 80.4 | 64.7 | 57.4 | 54.9 | 53.9 | 52.0 | 47.1 |
| 5 | | 0.8 | 100 | 95.2 | 90.1 | 76.2 | 66.3 | 56.4 | 52.5 | 50.5 | 48.5 | 47.0 | 46.0 |
| 5 | | | | | | | | | | | | | |
| 1 | 0.5 | 0.1 | 100 | 70.5 | 13.3 | 11.9 | 11.9 | 11.5 | 11 | 11 | 11 | 10.8 | 10.8 |
| 2 | | 0.2 | 100 | 95.5 | 73.1 | 58.5 | 51.8 | 44 | 39.5 | 34.2 | 32 | 32 | 32 |
| 3 | | 0.4 | 100 | 96.2 | 73.8 | 63.5 | 57 | 48.3 | 42.6 | 40.1 | 37.8 | 37.8 | 36.6 |
| 4 | | 0.6 | 100 | 96.8 | 95.1 | 85.7 | 80 | 63.8 | 56.8 | 54.3 | 52.6 | 51.2 | 47.1 |
| 5 | | 0.8 | 100 | 95.2 | 90.1 | 78.2 | 72.5 | 60.4 | 52.5 | 49.8 | 48 | 47.5 | 46.2 |

In the actual apparatus, the waste liquid is moved at a flow rate of 40 liters/h in 1.5 m piping with an internal diameter of 16.1 mm. The duration of this movement is about 30 seconds. During this period, it is desirable to feed the waste liquid while minimizing precipitate formation. Thus, the standard sedimentation ratio was set at 95% or more over 30 seconds.

Figure 2:
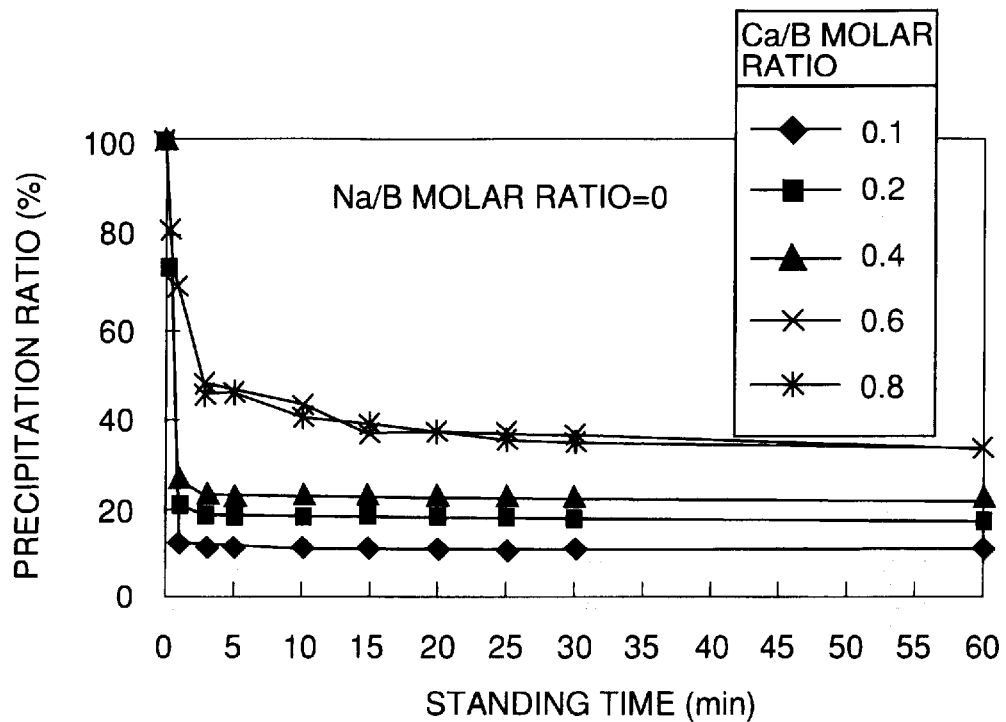
FIG. 2 is a graph showing the time courses of the sedimentation ratios (Na/B molar ratio=0) of insoluble borates in a boron-containing waste liquid in Test Example 1-1 of the method for treating the boron-containing waste liquid according to the invention.

When no sodium hydroxide was added, i.e., at an Na/B molar ratio of 0, the sedimentation ratio was plotted in a graph, with the Ca/B molar ratio as a parameter. This graph is shown in FIG. 2. A precipitate of the insoluble borate sedimented to a height of about 80% or less of the initial liquid level in a standing time of 30 seconds. Sedimentation was completed in about 1 to 3 minutes.

Figure 3:
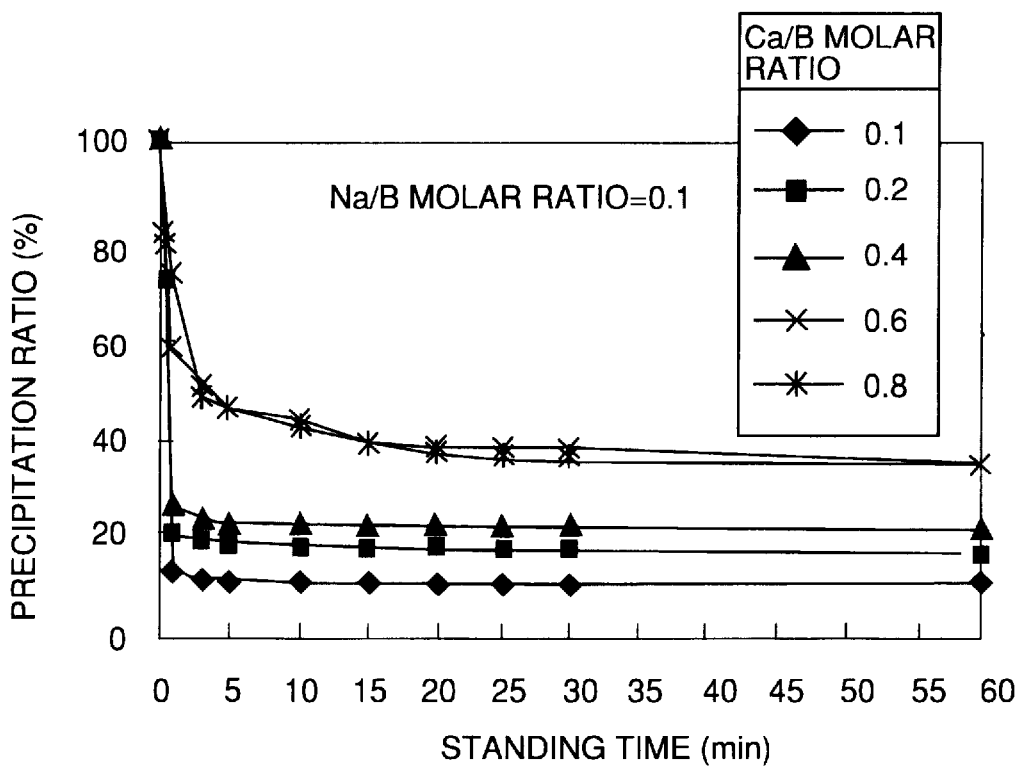
FIG. 3 is a graph showing the time courses of the sedimentation ratios (Na/B molar ratio=0.1) of insoluble borates in a boron-containing waste liquid in Test Example 1-1 of the method for treating the boron-containing waste liquid according to the invention.

The sedimentation ratio plotted at an Na/B molar ratio of 0.1, with the Ca/B molar ratio as a parameter, is shown in FIG. 3. The results are comparable to those at an Na/B molar ratio of 0. A precipitate sedimented to a height of about 80% or less of the initial liquid level in a standing time of 30 seconds. Sedimentation was completed in about 1 to 3 minutes.

Figure 4:
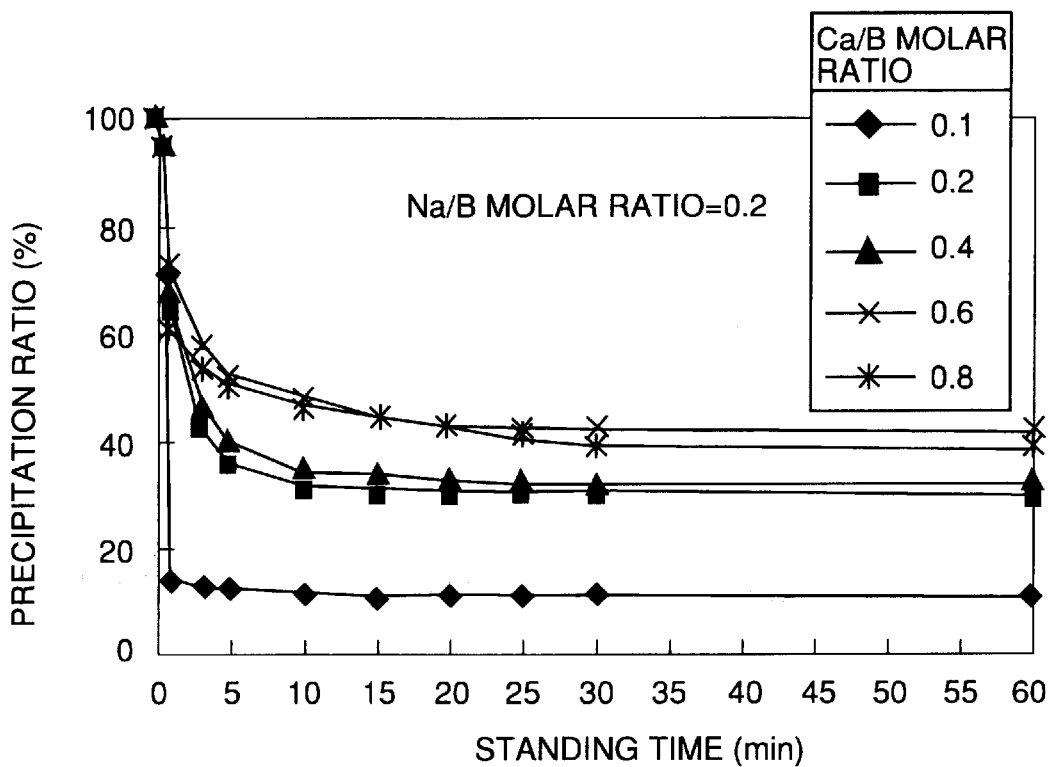
FIG. 4 is a graph showing the time courses of the sedimentation ratios (Na/B molar ratio=0.2) of insoluble borates in a boron-containing waste liquid in Test Example 1-1 of the method for treating the boron-containing waste liquid according to the invention.

The sedimentation ratio plotted at an Na/B molar ratio of 0.2, with the Ca/B molar ratio as a parameter, is shown in FIG. 4. The results are slightly different from those mentioned above. When the Ca/B molar ratio was 0.2 or higher, the sedimentation ratio was 95% or higher even in a standing time of 30 seconds. The sedimentation velocity at a later time was slower than at an Na/B molar ratio of 0 or 0.1. A period of about 10 minutes was required until a precipitate completely sedimented and the sedimentation ratio became stable.

Figure 5:
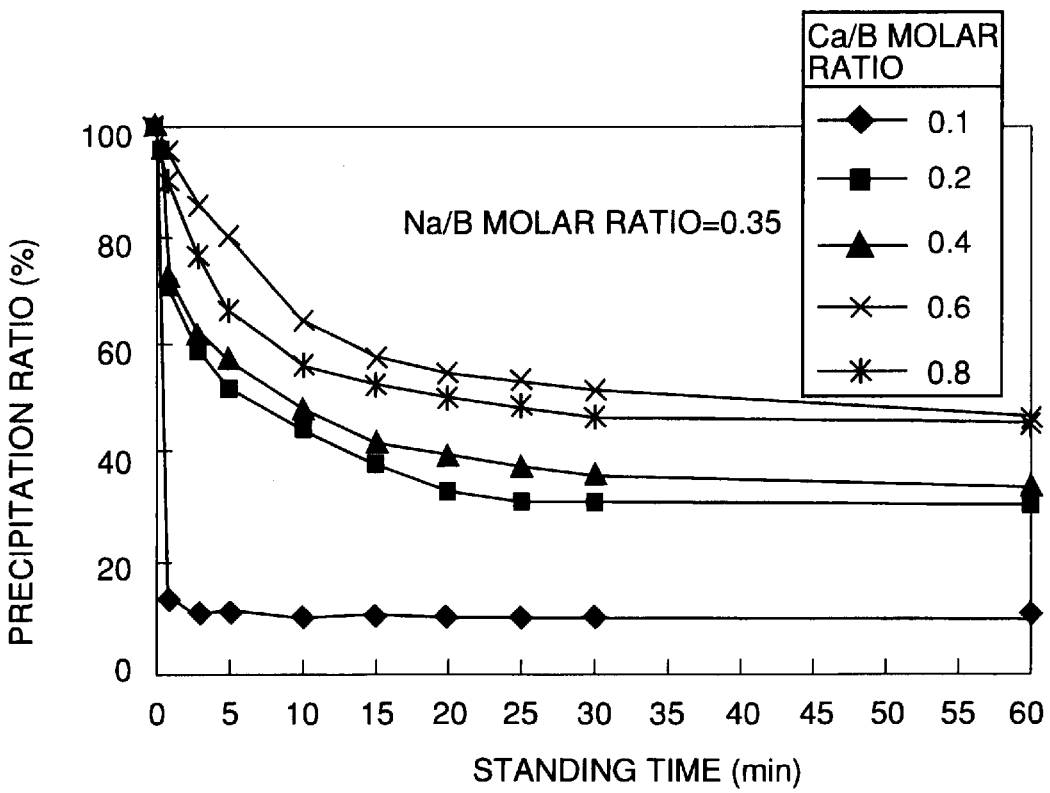
FIG. 5 is a graph showing the time courses of the sedimentation ratios (Na/B molar ratio=0.35) of insoluble borates in a boron-containing waste liquid in Test Example 1-1 of the method for treating the boron-containing waste liquid according to the invention.

The sedimentation ratio plotted at an Na/B molar ratio of 0.35, with the Ca/B molar ratio as a parameter, is shown in FIG. 5. When the Ca/B molar ratio was 0.2 or higher, the sedimentation velocity was similarly slow, and the sedimentation ratio remained 95% or higher even in a standing time of 30 seconds. A period of about 20 to 30 minutes was required until a precipitate completely sedimented and the sedimentation ratio became stable.

Figure 6:
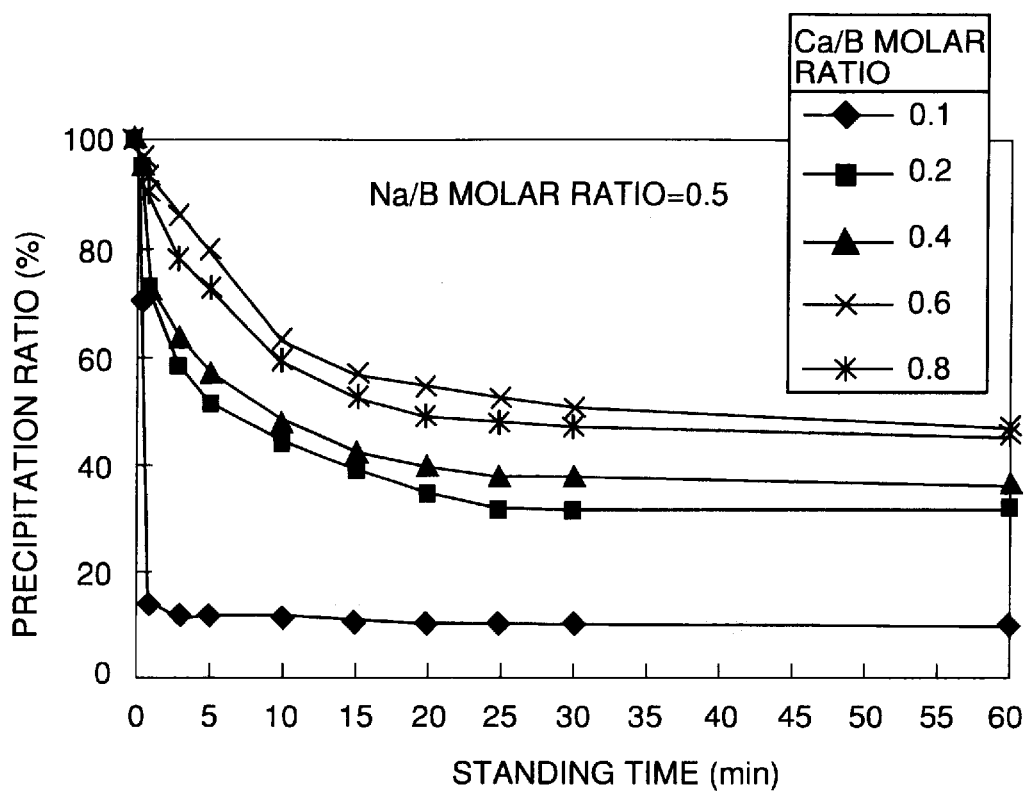
FIG. 6 is a graph showing the time courses of the sedimentation ratios (Na/B molar ratio=0.5) of insoluble borates in a boron-containing waste liquid in Test Example 1-1 of the method for treating the boron-containing waste liquid according to the invention.

The sedimentation ratio plotted at an Na/B molar ratio of 0.5, with the Ca/B molar ratio as a parameter, is shown in FIG. 6. When the Ca/B molar ratio was 0.2 or higher, the sedimentation velocity was similarly slow, and the sedimentation ratio remained 95% or higher even in a standing time of 30 seconds. This outcome was comparable to that at an Na/B molar ratio of 0.35. A period of about 20 to 30 minutes was required until a precipitate completely sedimented and the sedimentation ratio became stable.

From the foregoing results, it was confirmed that boric acid in a boric acid-containing waste liquid could be converted to an insoluble borate with a low precipitation velocity by adjusting the Na/B molar ratio of the waste liquid at 0.2 or higher, and the Ca/B molar ratio of the waste liquid at 0.2 to 0.8. Since the results obtained were comparable for a Ca/B molar ratio of from 0.6 to 0.8, the upper limit for the Ca/B molar ratio was set at 0.8.

<Test Example 1-2>

The sedimentation properties of precipitates from insoluble borate waste liquids, which were obtained by adding alkali metal element compounds and alkali earth metal compounds to a simulated boric acid waste liquid, were compared by performing the same procedure as in Test Example 1-1. In this test example, potassium hydroxide, sodium sulfate, potassium sulfate, sodium nitrate and potassium nitrate were used as the alkali metal element compounds, and magnesium hydroxide, calcium sulfate, magnesium sulfate, calcium nitrate, and magnesium nitrate were used as the alkali earth metal compounds. The sedimentation ratios of the resulting insoluble borate waste liquids when allowed to stand are summarized in Table 2.

Table 2 shows the results obtained for the relation among the additive proportion, the material added, and the standing time in Test Examples 6 and 7 subdivided into 1 to 6 runs, in comparison with a comparative example.

TABLE 2

| No. | Additive proportion (molar ratio) Alkali metal element/B | Additive proportion (molar ratio) Alkali earth metal element/B | Material added Alkali metal compound | Material added Alkali earth metal compound | Standing time (min) 0 | 0.5 | 1 | 3 | 5 | 10 | 15 | 20 | 25 | 30 | 60 |
|---|---|---|---|---|---|---|---|---|---|---|---|---|---|---|---|
| 6 | | | | | | | | | | | | | | | |
| 1 | 0.35 | 0.6 | Sodium hydroxide | Magnesium hydroxide | 100 | 95.2 | 94.1 | 86.7 | 71.5 | 64.8 | 53.5 | 53.3 | 49.0 | 48.2 | 47.2 |
| 2 | | | | Calcium sulfate | 100 | 95.2 | 94.1 | 86.7 | 79.4 | 66.4 | 56.4 | 51.5 | 49.9 | 48.0 | 47.1 |
| 3 | | | | Magnesium sulfate | 100 | 95.7 | 91.0 | 86.3 | 76.3 | 65.7 | 55.5 | 49.9 | 49.5 | 49.0 | 48.5 |
| 4 | | | | Calcium nitrate | 100 | 96 | 92.6 | 80.7 | 73.3 | 64.4 | 55.0 | 52.7 | 51.2 | 49.5 | 46.6 |
| 5 | | | | Magnesium nitrate | 100 | 96 | 92.6 | 81.8 | 76.3 | 62.1 | 54.7 | 52 | 50.3 | 49.3 | 46.7 |
| 6 | | | | Magnesium hydroxide + Calcium hydroxide | 100 | 95.5 | 91.6 | 84.2 | 71.2 | 66.5 | 54.8 | 52.7 | 51.2 | 50.0 | 49.2 |
| 7 | | | | | | | | | | | | | | | |
| 1 | 0.35 | 0.6 | Potassium hydroxide | Calcium hydroxide | 100 | 95.5 | 93.6 | 83.3 | 73.5 | 58.9 | 55.0 | 48.8 | 48.2 | 47.8 | 47 |
| 2 | | | Sodium sulfate | | 100 | 95.5 | 93.8 | 86.8 | 80.4 | 65.0 | 54.6 | 53.4 | 52.8 | 52.1 | 51.0 |
| 3 | | | Potassium sulfate | | 100 | 95.0 | 91.0 | 83.2 | 76.6 | 62.1 | 56.4 | 51.4 | 50.8 | 50.6 | 50.2 |
| 4 | | | Sodium nitrate | | 100 | 96.5 | 93.2 | 84.3 | 78.2 | 62.1 | 57.2 | 52.0 | 50.5 | 50.5 | 50.2 |
| 5 | | | Potassium nitrate | | 100 | 96.2 | 92.2 | 85.7 | 75.7 | 61.0 | 54.0 | 52.1 | 50.2 | 50.2 | 48.3 |
| 6 | | | Potassium hydroxide + Sodium hydroxide | | 100 | 96.2 | 95.1 | 83.5 | 80.0 | 63.3 | 56.8 | 54.1 | 52.6 | 51.8 | 47.6 |
| Comparative Example | 0 | 0.6 | Sodium hydroxide | Calcium hydroxide | 100 | 80.7 | 55.5 | 47.5 | 46.5 | 43.4 | 37.4 | 37.4 | 36.4 | 36.4 | 33.3 |

Figure 7:
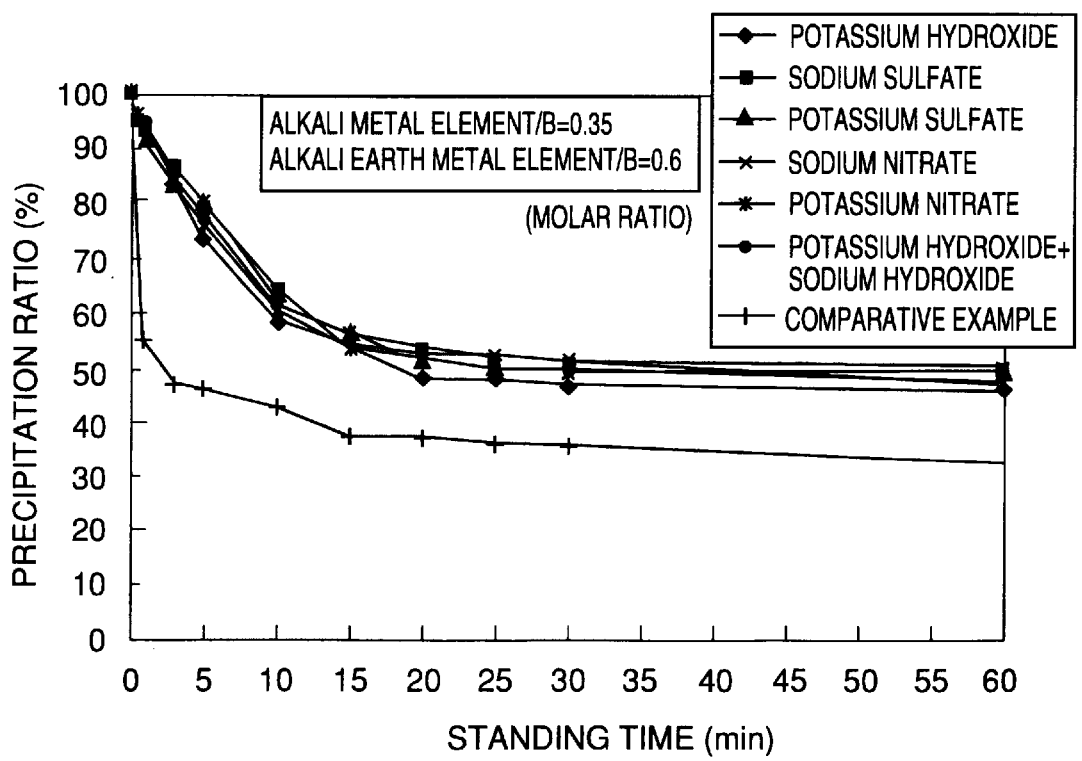
FIG. 7 is a graph showing influences on the time courses of the sedimentation ratios of insoluble borates in Test Example 1-2 concerned with the treatment of a boron-containing waste liquid according to the invention.

FIG. 7 shows the results of comparisons using potassium hydroxide, sodium sulfate, potassium sulfate, sodium nitrate, potassium nitrate, and a mixture of sodium hydroxide and potassium hydroxide, as alkali metal element compounds.

The molar ratio of the alkali metal element to B in the simulated waste liquid was adjusted to 0.35. Calcium hydroxide was further added to adjust the Ca/B molar ratio to 0.6. As shown in FIG. 7, all of the alkali metal element compounds gave results similar to those obtained with the use of sodium hydroxide, and showed decreases in the sedimentation velocity of the borate precipitate in comparison with the Comparative Example. The sedimentation ratio remained 95% or higher even in a standing time of 30 seconds. A period of about 20 to 30 minutes was required until the sedimentation ratio became stable.

Figure 8:
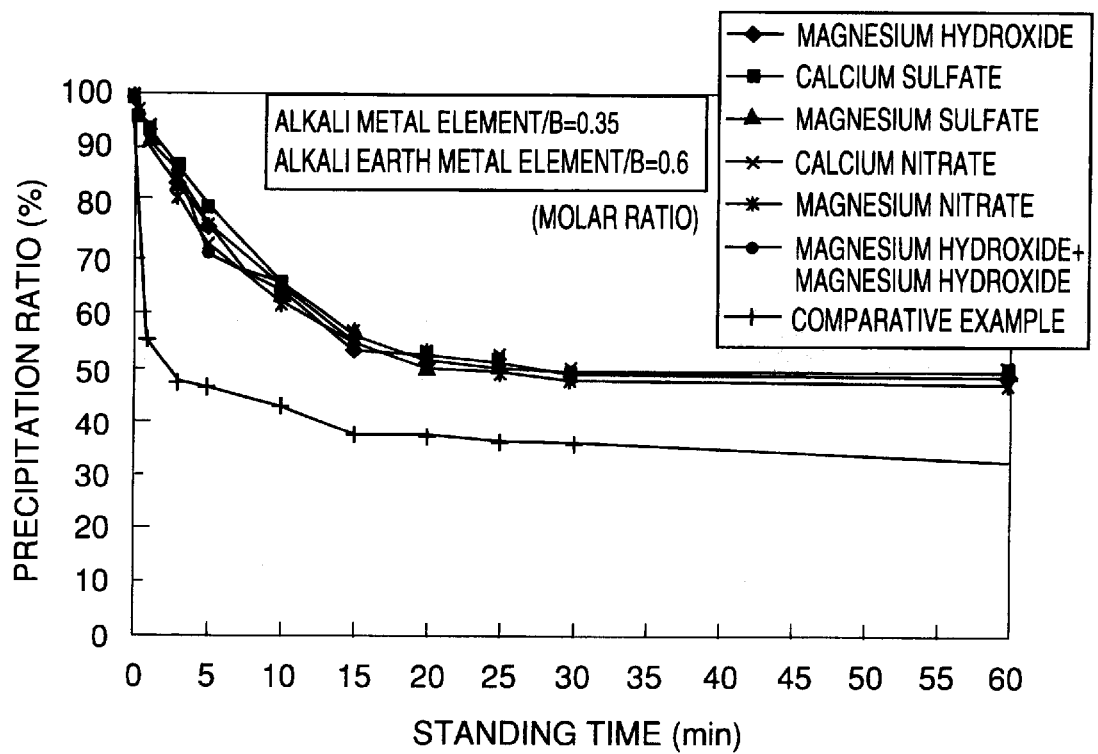
FIG. 8 is a graph showing influences of other alkali earth metal compounds on the time courses of the sedimentation ratios of insoluble borates in Test Example 1-2 concerned with the treatment of a boron-containing waste liquid according to the invention.

FIG. 8 shows the results of comparisons using magnesium hydroxide, calcium sulfate, magnesium sulfate, calcium nitrate, magnesium nitrate, and a mixture of calcium hydroxide and magnesium hydroxide, as alkali earth metal compounds. In the simulated waste liquid, the Na/B molar ratio was adjusted to 0.35 with the addition of sodium hydroxide. Then, the alkali earth metal compound was added to adjust the alkali earth metal element/B molar ratio to 0.6.

As shown in FIG. 8, all of the alkali earth metal compounds gave results similar to those obtained with the use of calcium hydroxide, and showed decreases in the sedimentation velocity of the borate precipitate in comparison with the comparative Example. The sedimentation ratio remained 95% or higher even in a standing time of 30 seconds. A period of about 20 to 30 minutes was required until the sedimentation ratio became stable.

(Test 2 of Waste Liquid Treatment—Test Using Actual Apparatus)

<Test Example 2-1>

Figure 9:
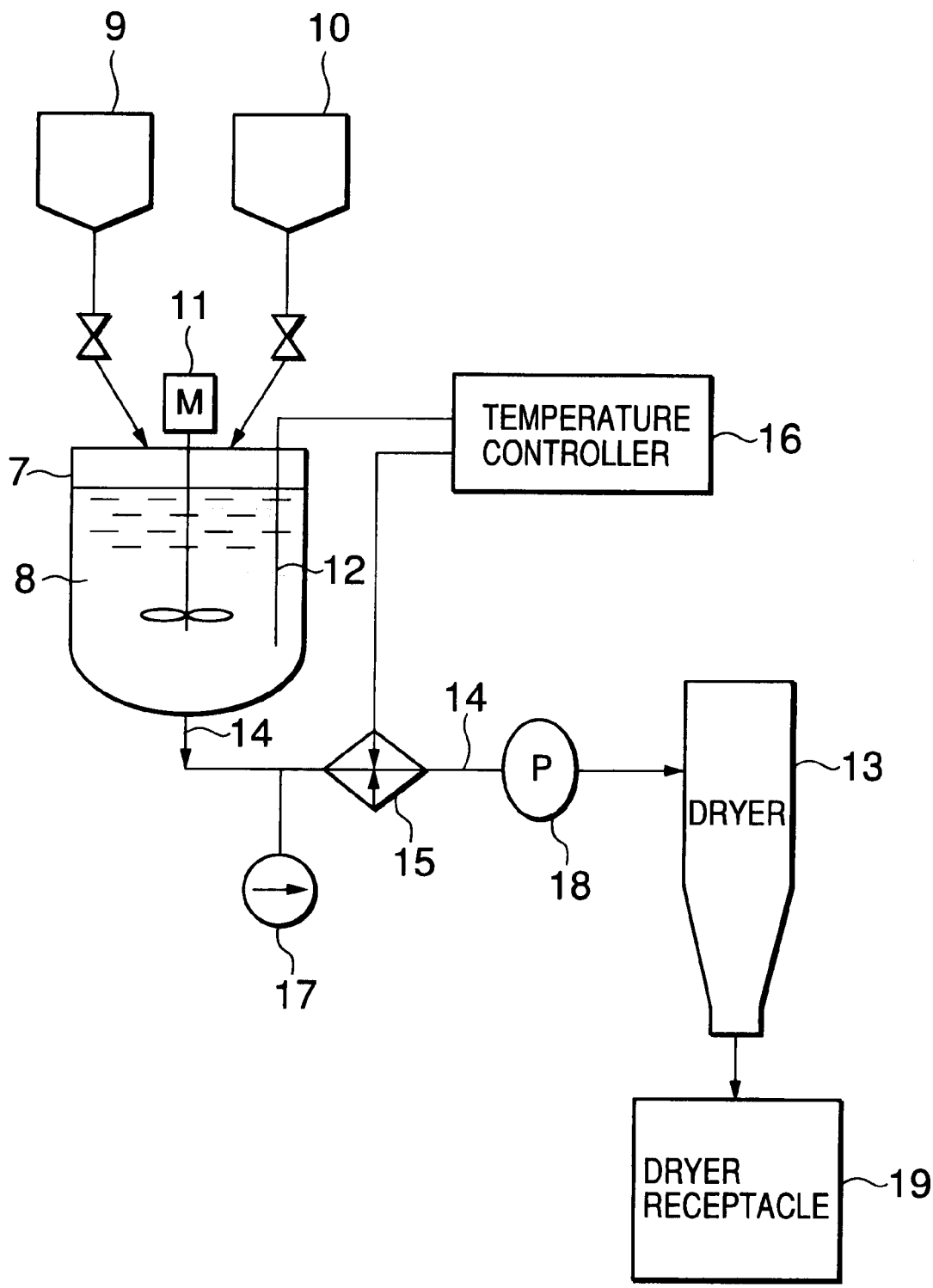
FIG. 9 is a system diagram showing Test Example 2-1 of an apparatus for treating a boron-containing waste liquid according to the invention.

In an example, a simulated waste liquid prepared under the conditions shown in Test Example 1-1 for the method of the invention was checked for feedability to a vertical thin film dryer and drying properties. With reference to FIG. 9, this example will be described as Test Example 2-1 of an apparatus for treating radioactive waste according to the invention.

In FIG. 9, the reference numeral 7 denotes a waste liquid tank for storing a boric acid waste liquid 8 generated in radioactive substance handling facilities. To an upper end portion of the waste liquid tank 7, an alkali metal element compound tank 9, and an alkali earth metal compound tank 10 are connected via valves. Inside the waste liquid tank 7, a stirrer 11 and a heater 12 are provided.

To a bottom of the waste liquid tank 7, a waste liquid line 14 is connected. The other end of the waste liquid line 14 is connected to a dryer 13. To the waste liquid line 14 connecting the waste liquid tank 7 to the dryer 13, a flowmeter 17, a heater 15 and a liquid feed pump 18 are connected. The heater 15 is connected to a temperature controller 16. The temperature controller 16 is also connected to the heater 12. To an outlet of the dryer 13, a dryer receptacle 19 is connected.

In a treating apparatus of the above constitution, the boric acid waste liquid (simulated waste liquid) 8 having a boron (B) concentration of 21,000 ppm was stored in the waste liquid tank 7. Sodium hydroxide was charged into the tank 7 from the alkali metal element compound tank 9 to adjust the Na/B molar ratio to 0.35. Then, calcium hydroxide was charged into the tank 7 from the alkali earth metal compound tank 10 to adjust the Ca/B molar ratio to 0.6, thereby obtaining an insoluble borate waste liquid.

The stirrer 11 is to prevent sedimentation of a precipitate in the insoluble borate waste liquid. The heater 12 is to heat the boric acid waste liquid 8. The waste liquid 8 was heated to a temperature of 80° C. with stirring, and supplied to the dryer 13 at a flow rate of 40 liters/h through the waste liquid line 14. In this test example, a vertical thin film dryer with a heat transfer area of 0.5 m² was used as the dryer 13. The heating temperature of the dryer 13 was 175° C.

On the waste liquid line 14 for supplying the boric acid waste liquid 8 to the dryer 13, the heater 15 was provided to maintain the entire waste liquid line 14 at a temperature of 80° C. The temperature was controlled by the temperature controller 16. The flowmeter 17 was a noncontact type electromagnetic flowmeter from which a sensor did not protrude into the waste liquid line 14. The waste liquid was supplied, with its flow rate being adjusted by a screw-type self-contained liquid feed pump 18.

The waste liquid line 14 leading to the dryer 13 was a 15A stainless steel piping of the same bore. In accordance with the above-described specifications, drying of the boric acid waste liquid 8 was performed for 8 hours. During this period, a dry powder was sampled into a dry powder receptacle 19 periodically, and measured for properties (moisture content, appearance). The results are shown in Table 3. If the moisture content of the powder exceeds 10 wt. %, appearance of the powder degrades. Thus, the standard value was set at 10 wt. % or less. As shown in the table, the dry powder had a moisture content of 10 wt. % or less, and a powdery appearance, even after 8 hours of operation. The flow rate of the waste liquid fed during operation was confirmed to be stable constantly.

TABLE 3

| Drying time (h) | Moisture content of powder (wt %) | Appearance of powder |
|---|---|---|
| 3 | 6.0 | Powdery |
| 6 | 8.0 | Powdery |
| 8 | 8.5 | Powdery |

<Test Example 2-2>

In an example, in connection with the method of supplying a simulated waste liquid to a dryer 13, feedability of the waste liquid was improved by providing a vibrator 20 on a waste liquid line 14 for passing the waste liquid to the dryer. This example will be described with reference to FIG. 10.

Figure 10:
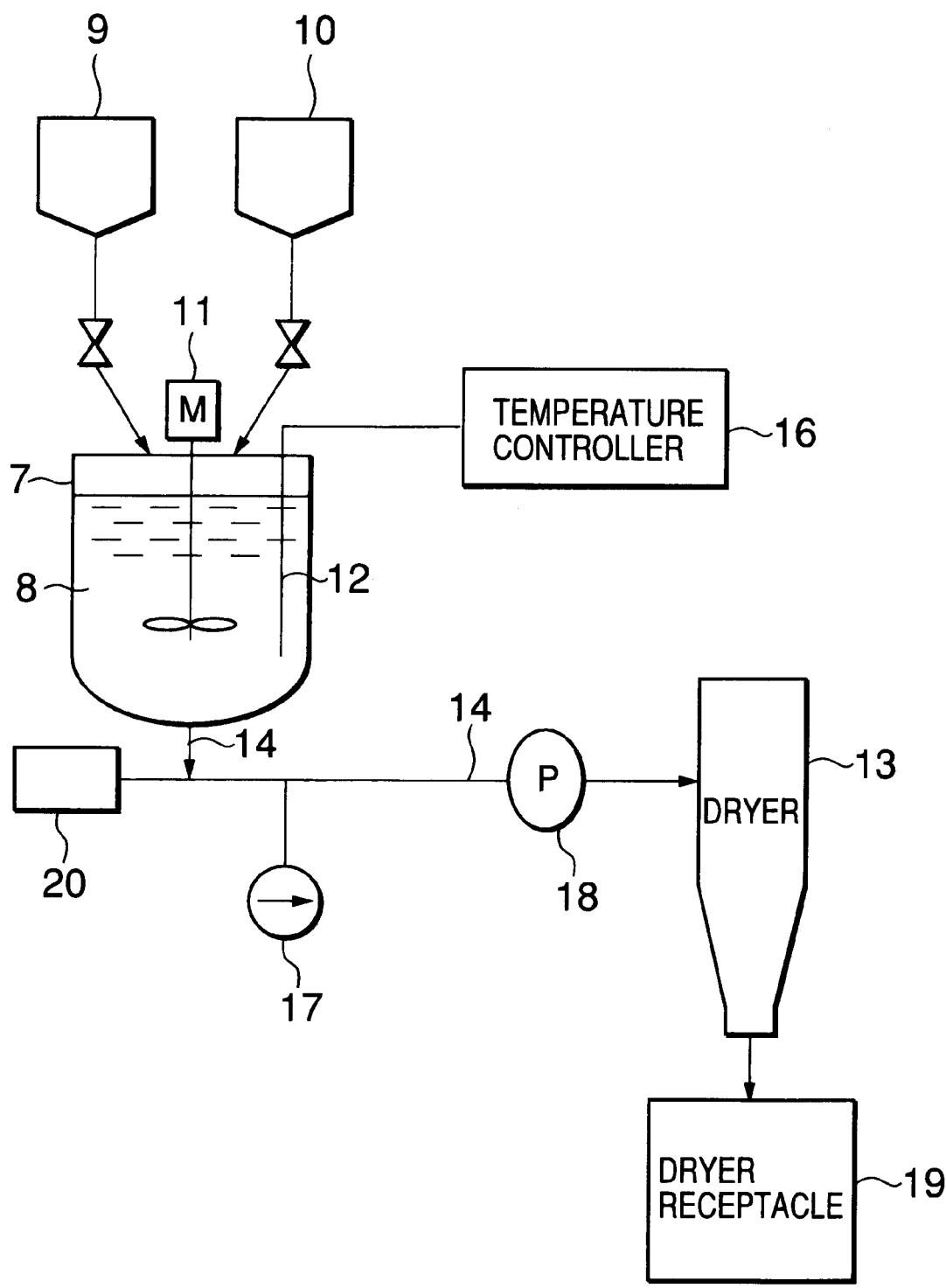
FIG. 10 is a system diagram showing Test Example 2-2 of an apparatus for treating a boron-containing waste liquid according to the invention.

FIG. 10 explains the layout of an apparatus for treating radioactive waste according to the invention. Under the same conditions as shown in Test Example 2-1, a boric acid waste liquid (simulated waste liquid) 8 having a boron (B) concentration of 21,000 ppm was stored in a waste liquid tank 7. Sodium hydroxide was charged into the tank 7 from an alkali metal element compound tank 9 to adjust the Na/B molar ratio to 0.35. Then, calcium hydroxide was charged into the tank 7 from an alkali earth metal compound tank 10 to adjust the Ca/B molar ratio to 0.6, thereby obtaining an insoluble borate waste liquid. The waste liquid was stirred by a stirrer 11 for preventing sedimentation of a precipitate. At the same time, the waste liquid was heated by a heater 12 to a temperature of 80° C. In this state, the waste liquid was supplied to a dryer 13 at a flow rate of 40 liters/h.

In this test example, a vertical thin film dryer with a heat transfer area of 0.5 m² was used as the dryer 13. The heating temperature of the dryer 13 was 175° C. On the waste liquid line 14 for supplying the boric acid waste liquid 8 to the dryer 13, no heater was provided. Instead, a vibrator 20 was installed for vibration, whereby sedimentation in the waste liquid line 14 could be prevented.

In the present test example, vibration was performed by an air knocker with a frequency of 5 seconds/vibration. A flowmeter 17 was a noncontact type electromagnetic flowmeter from which a sensor did not protrude into the waste liquid line 14. The waste liquid was supplied, with its flow rate being adjusted by a screw-type self-contained liquid feed pump 18. The waste liquid line 14 leading to the dryer 13 was a stainless steel piping of the same bore (internal diameter 16.1 mm).

In accordance with the above-described specifications, drying of the boric acid waste liquid 8 was performed for 8 hours. During this period, a dry powder was sampled into a dry powder receptacle 19 periodically, and measured for properties (moisture content, appearance). The results are shown in Table 4. As shown in Table 4, the dry powder was a satisfactory powder having a stable moisture content of 10 wt. % or less, and a powdery appearance, even after 8 hours of operation. The flow rate of the waste liquid fed during operation was always stable.

The present test example confirmed an effect resulting from the mounting of the vibrator 20 on the waste liquid line 14 to perform vibration. A separate test was conducted using an ultrasonic oscillator as the vibrator 20, and confirmed tat the waste liquid could be fed to the dryer and dried without any problem.

TABLE 4

| Drying time (h) | Moisture content of powder (wt %) | Appearance of powder |
|---|---|---|
| 3 | 6.5 | Powdery |
| 6 | 8.0 | Powdery |
| 8 | 7.5 | Powdery |

<Test Example 2-3>

In accordance with the same specifications and procedure as in Test Example 2-1, the boric acid waste liquid 8 was dried by the dryer 13. At this time, the boric acid waste liquid 8 was supplied to the dryer 13, without actuating the heater 15 on the waste liquid line 14, and without keeping the temperature of the waste liquid line 14. As a result, the waste liquid line 14 was clogged in about 1 hour after initiation of liquid supply. The flow rate of the liquid decreased, and drying was terminated.

Subsequent inspection of the interior of the waste liquid line 14 showed that sediment of borate deposited, starting in an intermediate portion between the liquid feed pump 18 and the dryer 13, to clog the waste liquid line 14. This may be because the temperature of the boric acid waste liquid 8 fell in the waste liquid line 14, further precipitating the insoluble salt. These results ascertained the effect produced by heating and keeping the entire waste liquid line 14 at a waste liquid temperature of 80° C. or higher with the heater 15.

<Test Example 2-4>

In accordance with the same specifications and procedure as in Test Example 2-1, the boric acid waste liquid 8 was dried by the dryer 13. At this time, the waste liquid line 14 was constituted to have a structure upwardly inclining toward the dryer 13 at an angle of about 15° with a horizontal surface. As a result, the waste liquid line 14 was clogged in about 1 hour after initiation of liquid supply. The flow rate of the liquid decreased, and drying came to a halt.

Subsequent inspection of the interior of the waste liquid line 14 showed that sediment of borate deposited, starting in an initial portion of the upward inclination, to clog the waste liquid line 14. This outcome ascertained the effect produced by a constitution in which the waste liquid line 14 is parallel to a horizontal surface until its entry into the dryer 13. It was also confirmed that there was no problem when the waste liquid line 14 inclined downward relative to a horizontal surface until its entry into the dryer 13.

<Test Example 2-5>

In accordance with the same specifications and procedure as in Test Example 2-1, the boric acid waste liquid 8 was dried by the dryer 13. At this time, the waste liquid line 14 was constituted such that the bore of piping forward of the liquid feed pump 18 installed on the waste liquid line 14 was decreased to an internal diameter of 12.7 mm. As a result, the waste liquid line 14 was clogged in about 45 minutes after initiation of liquid supply. The flow rate of the liquid decreased, and drying came to a halt.

Subsequent inspection of the interior of the waste liquid line 14 showed that sediment of borate deposited, starting at the site where the bore of the piping line was decreased to an internal diameter of 12.7 mm, thus clogging the waste liquid line 14. This outcome ascertained the effect produced by a constitution in which the waste liquid line 14 has the same bore until its entry into the dryer 13. It was also confirmed that the waste liquid could be fed without problem when the waste liquid line 14 had an increasing bore toward the dryer 13 until its entry into the dryer 13.

<Test Example 2-6>

In accordance with the same specifications and procedure as in Test Example 2-1, the boric acid waste liquid 8 was dried by the dryer 13. At this time, the flowmeter 17 installed on the waste liquid line 14 was constituted such that its sensor protruded into the line. As a result, the waste liquid line 14 was clogged in about 1 hour after initiation of liquid supply. The flow rate of the liquid decreased, and drying came to a halt.

Subsequent inspection of the interior of the waste liquid line 14 showed that sediment of borate deposited, starting at the site of the flowmeter 17, thus clogging the waste liquid line 14. This outcome ascertained the effect produced when a noncontact type electromagnetic flowmeter having a sensor not protruding into the line is used as the flowmeter 17 for control of the flow rate of the waste liquid.

<Test Example 2-7>

In accordance with the same specifications and procedure as in Test Example 2-1, the boric acid waste liquid 8 was dried by the dryer 13. At this time, a tube type roller pump was used as the liquid feed pump 18 installed on the waste liquid line 14. As a result, the waste liquid line 14 was clogged in about 1.5 hours after initiation of liquid supply. The flow rate of the liquid decreased, and drying came to a halt.

Subsequent inspection of the interior of the waste liquid line 14 showed that sediment of borate deposited, starting at the site where the roller pump pushed out the tube, thus clogging the waste liquid line 14. This outcome ascertained the effect produced when a screw pump is used as the liquid feed pump 18 for the waste liquid.

Treatment of Boron-containing Waste (Solidification)

(Test Example 3 of Waste Solidification—Test on a Laboratory Level)

<Test Example 3-1>

A waste liquid having a boron concentration of 21,000 ppm as a simulated waste liquid of boric acid was prepared at 80° C., and adjusted to contain 0 to 0.35 mol of sodium with respect to boron and 0 to 0.7 mol of calcium with respect to boron. This waste liquid was sent to a dryer, with the temperature of the waste liquid being maintained, to dry and powder the waste liquid by the dryer with a heat transfer area of 0.5 $m^2$. The resulting powder (the borate weight: 80 kg based on a 200-liter metal drum), portland cement, sodium phosphate as a chemical admixture were mixed in an in-drum mixer. The amount of the chemical admixture was 1% by weight based on the cement. The viscosity of the resulting kneaded product was measured with a rotational viscometer. Then, a separately sampled kneaded product was aliquoted into a formwork having a height of 10 cm and a diameter of 5 cm, and after 28 days of curing, the uniaxial compressive strength of the cured product was measured. The waste liquid, adjusted to an Na/B molar ratio of 0.2 and a Ca/B molar ratio of 0.2 with the use of sodium hydroxide and calcium hydroxide, was cooled to 60° C. or lower. Then, the cooled waste liquid was dried at this temperature, or was dried after reheating to 80° C. For each of these cases, the viscosity of the kneaded product and the uniaxial compressive strength of the cured product were measured similarly.

Figure 11:
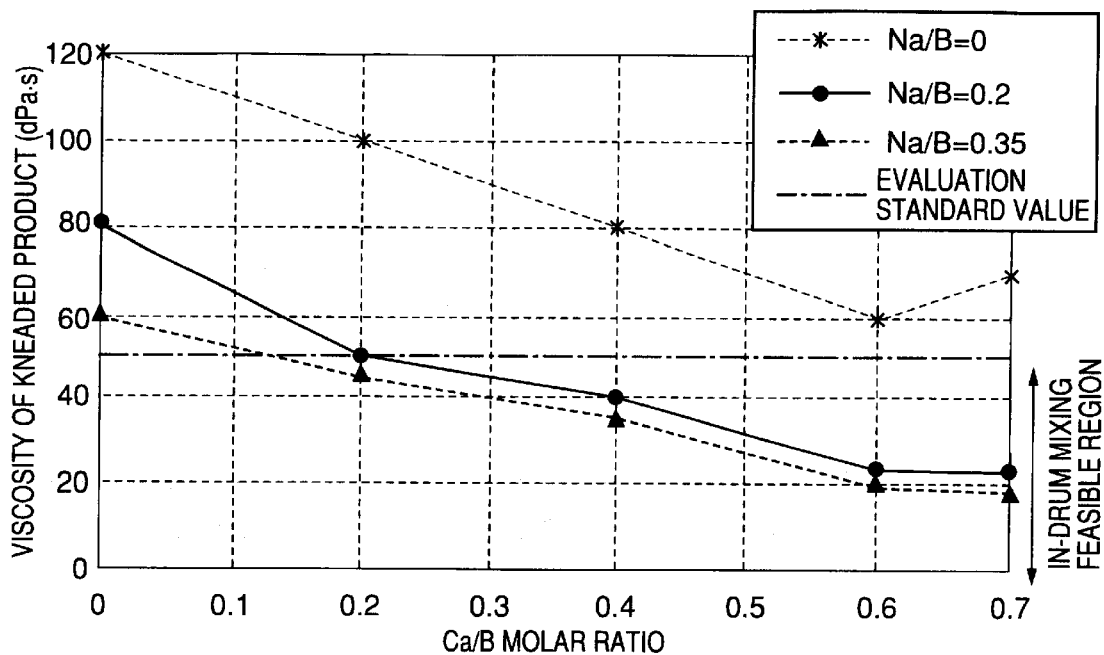
FIG. 11 is a graph showing changes in viscosity of cement kneaded product versus the Ca/B molar ratio of boron-containing waste.
Figure 12:
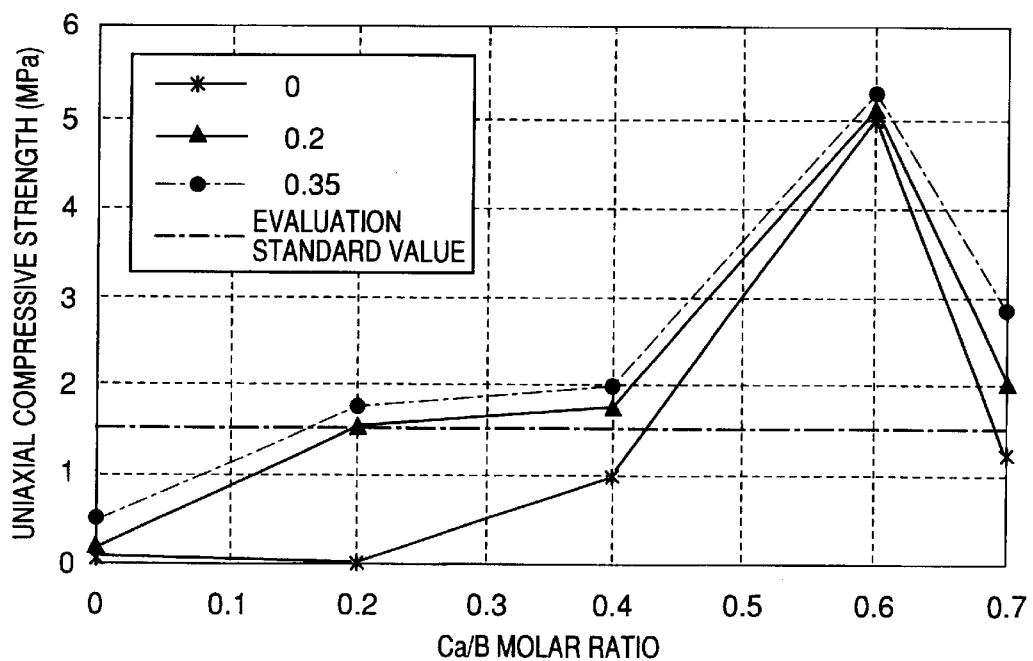
FIG. 12 is a graph showing changes in viscosity of cement solidification product versus the Ca/B molar ratio of boron-containing waste.

The test results obtained with the temperature of the waste liquid being maintained at 80° C. are shown in FIGS. 11 to 12.

When Na/B=0.2 or higher and Ca/B=0.2 or higher, it was confirmed that the kneaded product had a viscosity permitting in-drum mixing, and the strength of the kneaded product after solidification surpassed the evaluation standard value. At the Na/B ratio and Ca/B ratio lower than those mentioned above, the viscosity of the kneaded product was 50 dPa·s or higher. Lumps of the dry powder were noted here and there in the kneaded product. Thus, kneading was judged to be poor.

Figure 13:
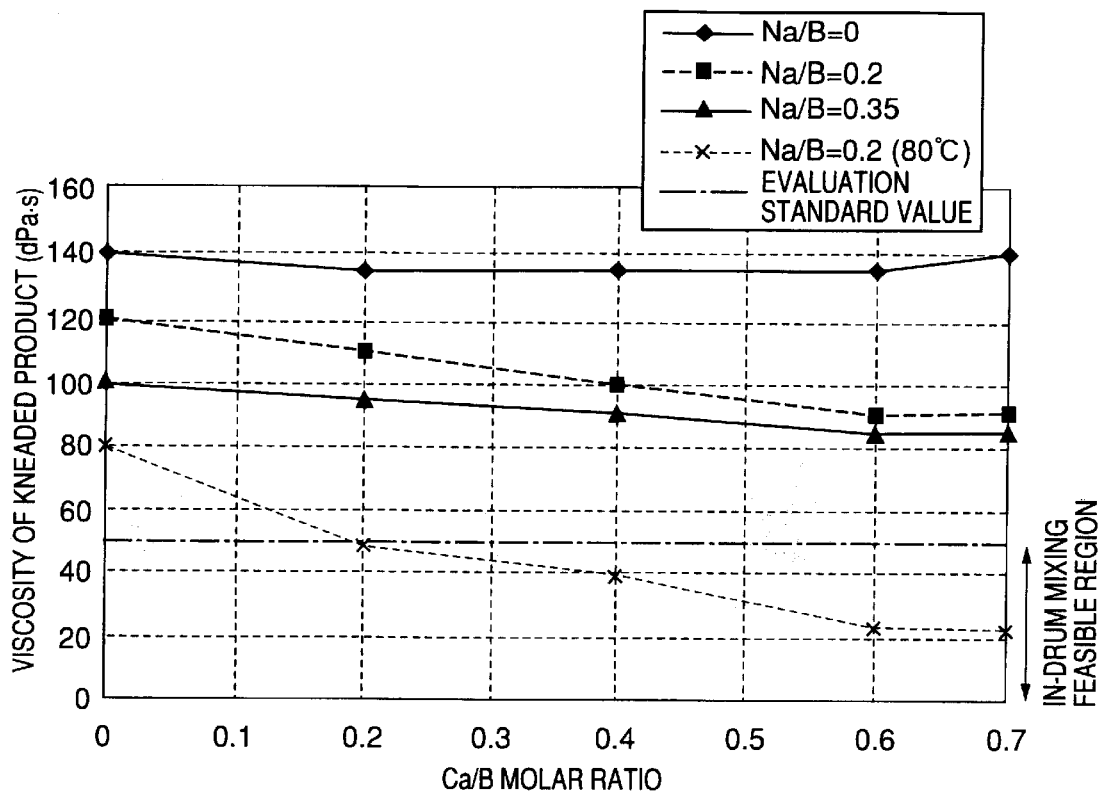
FIG. 13 is a graph showing viscosity of a mixture formed by maintaining a boron-containing waste liquid at 60° C. or lower, then drying the waste liquid, and kneading the dry product with cement.
Figure 14:
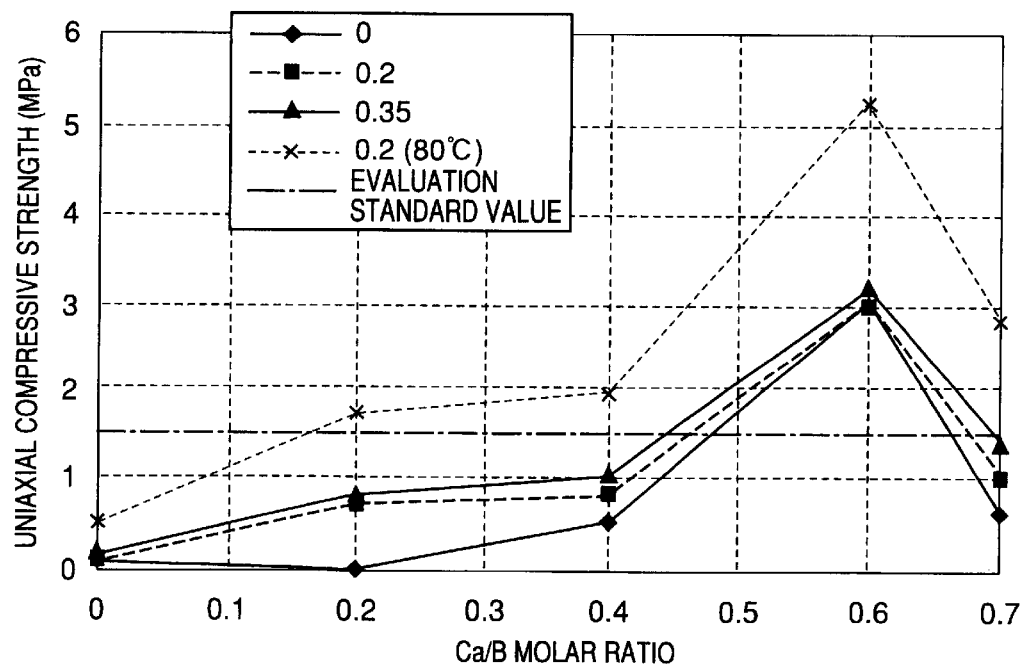
FIG. 14 is a graph showing strength of a material formed by maintaining a boron-containing waste liquid at 60° C. or lower, then drying the waste liquid, kneading the dry product with cement, and solidifying the kneaded product.

The test results obtained with the temperature of the waste liquid being changed or set at 60° C. or lower are shown in FIGS. 13 to 14. When the waste liquid was dried at a temperature of 60° C. or lower, its supply to a vertical thin film dryer was difficult. The resulting dry powder showed scattered dry lumps, and the viscosity of the kneaded product and the compressive strength of the cured product were confirmed to be low.

(Test Example 4 of Waste Solidification—Test Using Actual Apparatus)

<Solidification Test Example 4-1>

Figure 15:
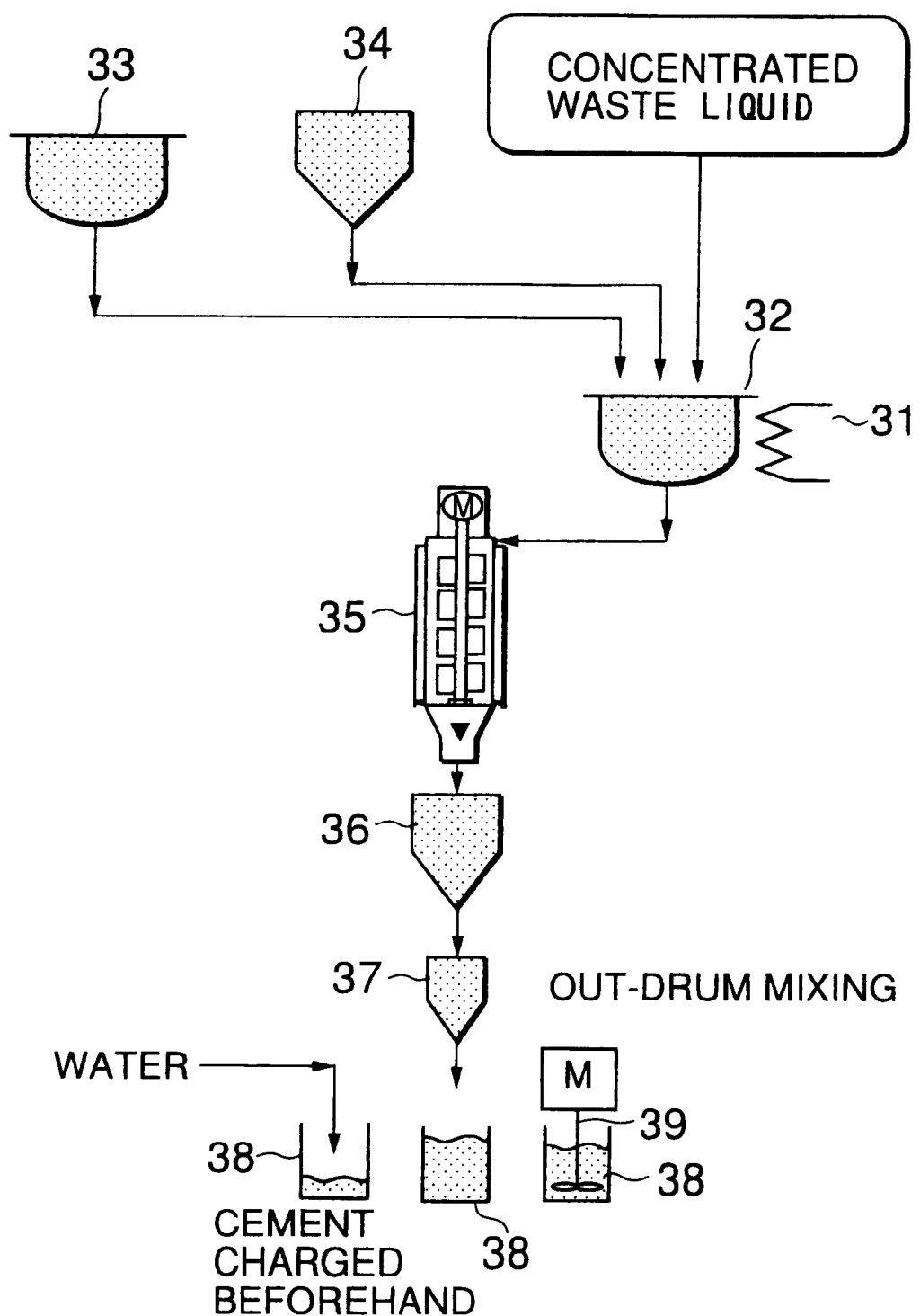
FIG. 15 is a system diagram of an apparatus for treating a boron-containing waste liquid.
Figure 16:
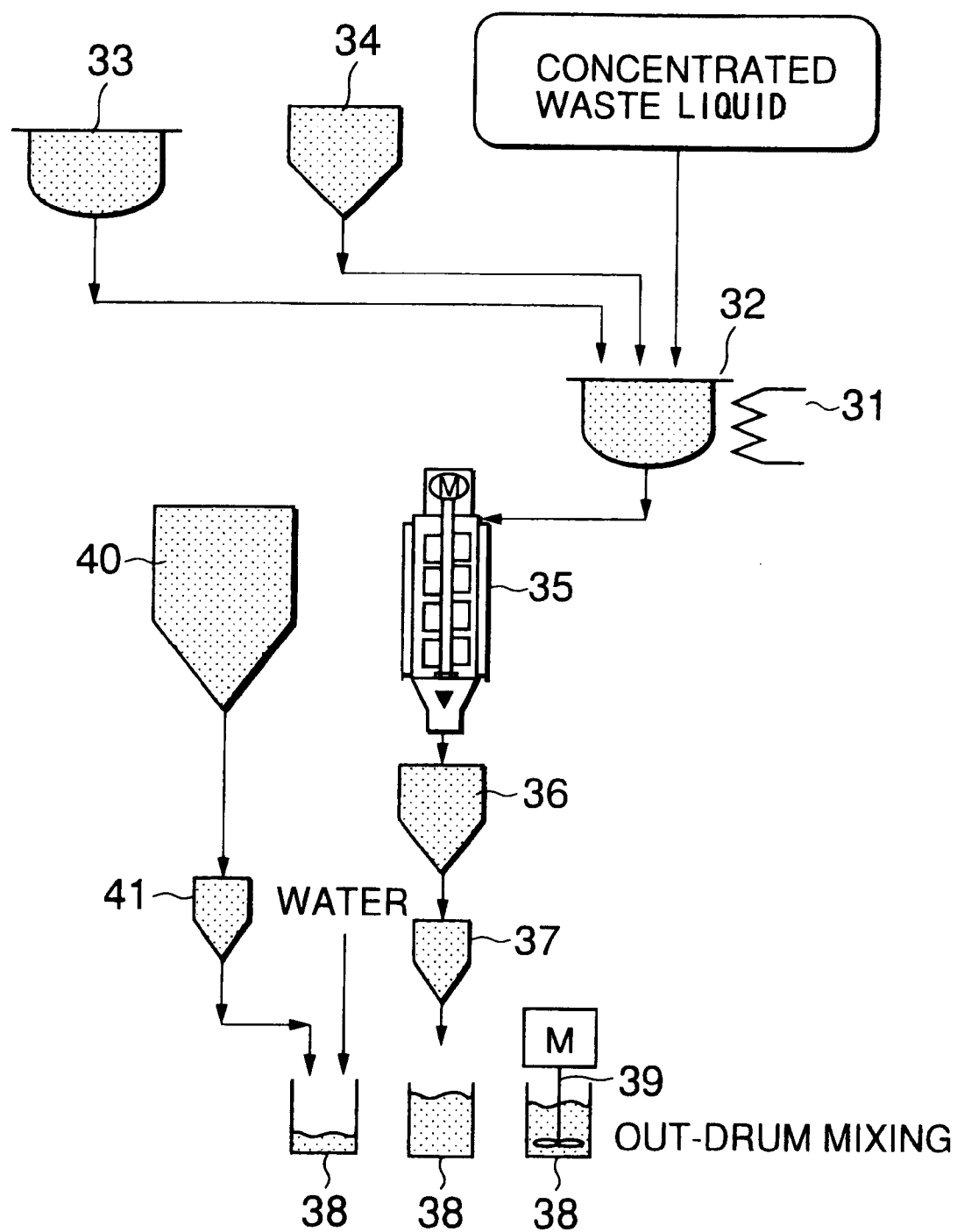
FIG. 16 is a system diagram of another apparatus for treating a boron-containing waste liquid.
Figure 17:
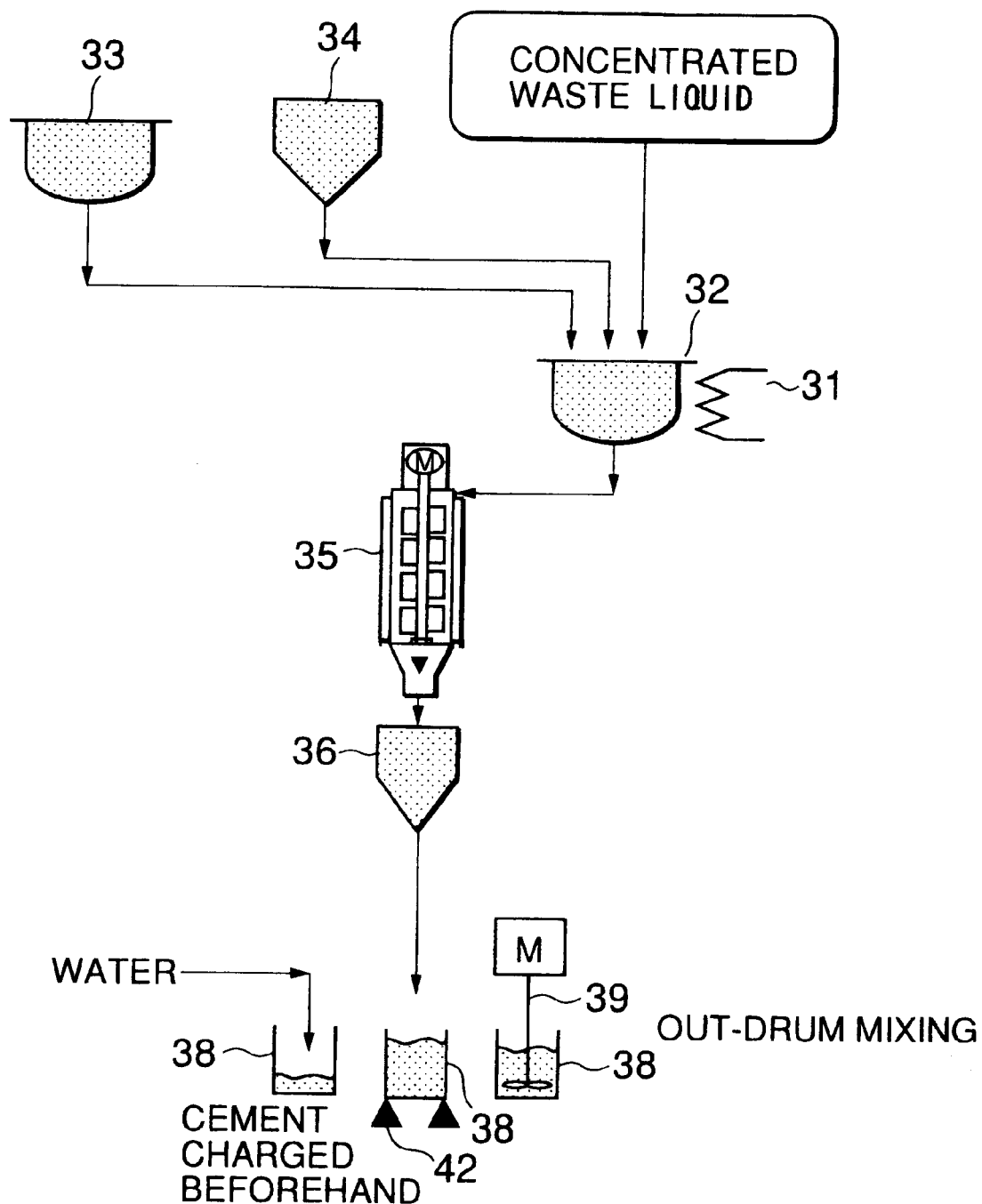
FIG. 17 is a system diagram of another apparatus for treating a boron-containing waste liquid.

FIG. 15 shows a concrete apparatus layout according to the invention. The apparatus of the invention has a radioactive waste liquid storage tank 32 having a heater 31, an alkali metal compound solution tank 33 for supplying a solution of an alkali metal element compound into the radioactive waste liquid storage tank 32, and an alkali earth metal compound storage tank 34 for accommodating an alkali earth metal element compound. In the radioactive waste liquid storage tank 32, a radioactive boric acid waste liquid, a solution of an alkali metal element, and an alkali earth metal element compound are mixed. The mixing ratio of these chemicals is adjusted to have the element/boron molar ratios described in Test Example 3-1. The temperature of the waste liquid is similarly adjusted to the temperature disclosed in Test Example 3-1. A mixed solution prepared is fed to a vertical thin film dryer 35, where it is converted to a dry powder, and then stored in a dry powder storage tank 36. The dry powder from the dry powder storage tank 36 is supplied to a radioactive waste storage container 38 via a dry powder measuring tank 37, where necessary. The radioactive waste storage container 38 accommodates, beforehand, a cementitious solidifying material, a chemical admixture for improving fluidity of the cementitious solidifying material, and water in a kneaded state. A kneading vane 39 is placed in the system to knead the dry powder, and then the system is solidified. As shown in FIG. 16, a cementitious solidifying material may be supplied from a cement silo 40 into the radioactive waste storage container 38 via a cement measuring tank 41. As shown in FIG. 17, it is also permissible to remove the dry powder measuring tank 37, and measure the weight of the radioactive waste storage container 38 with a storage container measuring machine 42 to control the weight of the dry powder.

As the layout of the presently claimed apparatus, those having the above-mentioned instruments are all included in the present invention, regardless of the size of the instruments, the order of arrangement of the instruments, and the order of addition of the chemicals.

<Test Example 4-2>

The effect of the invention was investigated with the types of the elements added being changed.

A boric acid waste liquid having a boron concentration of 21,000 ppm was heated to 80° C., and adjusted to have an alkali metal element/boron molar ratio of 0.2 and an alkali earth metal element/boron molar ratio of 0.6 with the addition of a potassium hydroxide solution as an alkali metal element compound, and with the addition of calcium sulfate, calcium nitrate, or magnesium hydroxide as an alkali earth metal element compound. This waste liquid was dried and powdered in a vertical thin film dryer with a heat transfer area of 0.5 m². To the resulting powder, portland cement as a cementitious solidifying material, and sodium phosphate as a chemical admixture were added for in-drum mixing and solidification. The amount of the mixture solidified was 80 kg as borate weight based on a 200-liter metal drum, as in Test Example 3-1. The viscosity of the kneaded product of the cementitious material and the dry powder, and the mechanical properties of the solidification product were measured. The results are shown in Table 5.

The viscosity of the kneaded product was 50 dPa·s or lower, as in the case of using sodium hydroxide and calcium hydroxide as chemicals. This confirmed the viscosity to be sufficiently low to permit in-drum mixing. The compressive strength of the resulting solidification product was confirmed to surpass the evaluation standard value fully.

TABLE 5

Influences of types of alkali metal element and alkali earth metal element

| Alkali metal element (AM) | Alkali earth metal element (AL) | AM/B (molar ratio) | AL/B (molar ratio) | Viscosity of kneaded product (dPa · s)* | Uniaxial compressive strength (MPa)** |
|---|---|---|---|---|---|
| NaOH | Ca(OH)$_2$ | Na/B = 0.2 | Ca/B = 0.6 | 20 | 5 |
| NaOH | CaSO$_4$ | Na/B = 0.2 | Ca/B = 0.6 | 20 | 4.5 |
| NaOH | Ca(No$_3$)$_2$ | Na/B = 0.2 | Ca/B = 0.6 | 20 | 4 |
| KOH | Ca(OH)$_2$ | K/B = 0.2 | Ca/B = 0.6 | 25 | 5 |

TABLE 5-continued

Influences of types of alkali metal element and alkali earth metal element

| Alkali metal element (AM) | Alkali earth metal element (AL) | AM/B (molar ratio) | AL/B (molar ratio) | Viscosity of kneaded product (dPa · s)* | Uniaxial compressive strength (MPa)** |
|---|---|---|---|---|---|
| NaOH | Mg(OH)$_2$ | Na/B = 0.2 | Mg/Ca = 0.6 | 30 | 4 |
| .KOH | Mg(OH)$_2$ | K/B = 0.2 | Mg/B = 0.6 | 25 | 5 |

*Evaluation standard value: 50 dPa · s or less
**Evaluation Standard value: 1.5 MPa or more <Test Example 4-3>

This is an example for investigating the effect of the invention, with the type of the cementitious solidifying material being changed.

A boric acid waste liquid having a boron concentration of 21,000 ppm was heated to 80° C., and adjusted to Na/B=0.2 and Ca/B=0.6 with the addition of sodium hydroxide and calcium hydroxide. This waste liquid was dried and powdered in a vertical thin film dryer with a heat transfer area of 0.5 m². To the resulting powder, a cementitious solidifying material was added for in-drum mixing and solidification. The cementitious solidifying material was blast furnace cement or fly ash cement. Sodium phosphate was used as a chemical admixture. The amount of the mixture solidified was 80 kg as borate weight based on a 200-liter metal drum, as in Test Example 3-1. The viscosity of the kneaded product of the cementitious material and the dry powder was measured during kneading, and the mechanical properties of the solidification product were measured after solidification. The results are shown in Table 6.

The viscosity of the kneaded product was 50 dPa·s or lower, when either cementitious solidifying material was used. This confirmed the viscosity to be sufficient for in-drum mixing. The compressive strength of the resulting solidification product was confirmed to surpass the evaluation standard value fully.

TABLE 6

Influence of type of cement material

| Cementitious material | Na/B (molar ratio) | Ca/B (molar ratio) | Amount of chemical admixture added (wt %) | Viscosity of kneaded product (dPa · s)* | Uniaxial compressive strength (MPa)** |
|---|---|---|---|---|---|
| Portland cement | 0.2 | 0.6 | 1 | 20 | 5 |
| Blast furnace cement (50% blast furnace slag added) | 0.2 | 0.6 | 1 | 22 | 4.5 |
| Blast furnace cement (70% blast furnace slag added) | 0.2 | 0.6 | 1 | 23 | 4 |
| Fly ash cement (30% fly ash added) | 0.2 | 0.6 | 1 | 15 | 5 |

*Evaluation standard value: 50 dPa · s or less
**Evaluation Standard value: 1.5 MPa or more <Test Example 4-4>

This is an example for investigating the effect of the invention in connection with the type of a chemical admixture and its amount added.

A boric acid waste liquid having a boron concentration of 21,000 ppm was heated to 80° C., and adjusted to Na/B=0.2 and Ca/B=0.6 with the addition of sodium hydroxide and calcium hydroxide. This waste liquid was dried and powdered in a vertical thin film dryer with a heat transfer area of 0.5 m². To the resulting powder, a cementitious solidifying material was added for in-drum mixing and solidification. The cementitious solidifying material was portland cement. To the portland cement, sodium phosphate was added beforehand as a chemical admixture in a proportion of 0.5% based on the cement. A sample containing potassium carbonate, phosphate glass, lignin sulfonic acid, carboxylic acid, or naphthalenesulfonic acid formaldehyde added thereto as the chemical admixture was prepared separately. The amount of the mixture solidified was 80 kg as borate weight based on a 200-liter metal drum, as in Test Example 3-1. The viscosity of the kneaded product of the cementitious material and the dry powder was measured during kneading, and the mechanical properties of the solidification product were measured after solidification. The results are shown in Table 7.

Figure 18:
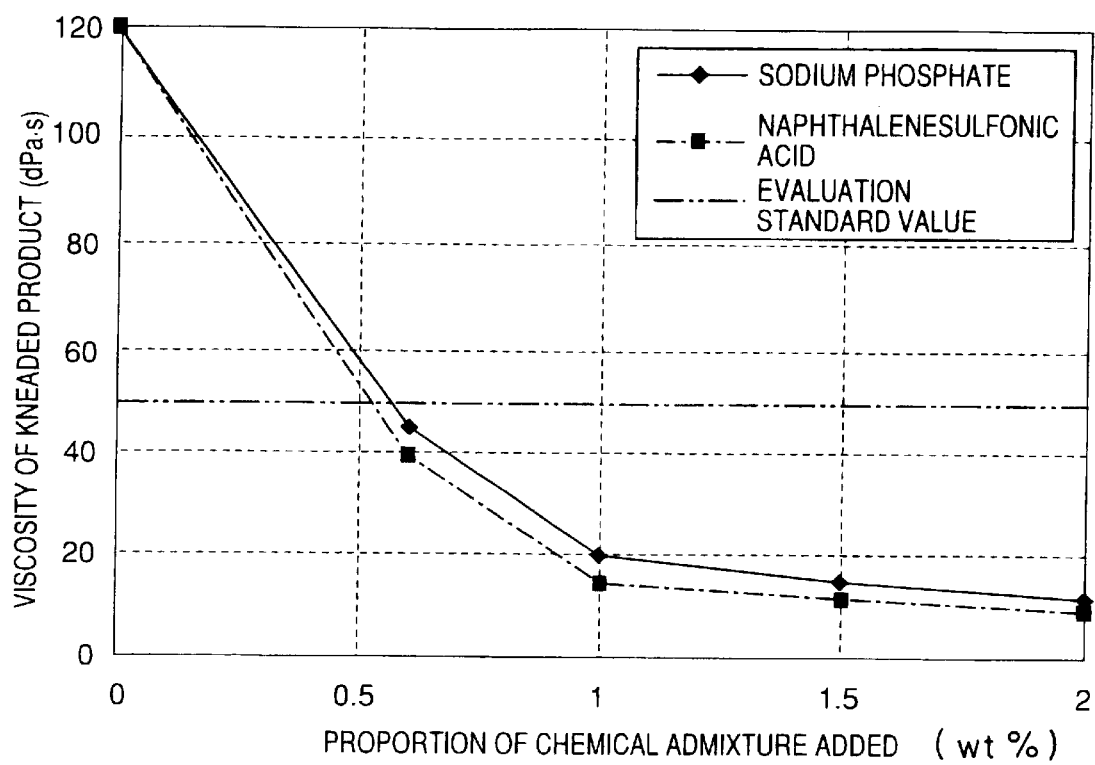
FIG. 18 is a graph showing changes in viscosity of cement kneaded product versus the amount of a chemical admixture added.

Changes in the viscosity of the kneaded product according to changes in the amount of naphthalenesulfonic acid formaldehyde or sodium phosphate added to cement are shown in FIG. 18.

The viscosity of the kneaded product was 50 dPa·s or lower, when any of the chemical admixtures was added. This confirmed the viscosity to be sufficient for in-drum mixing. The compressive strength of the resulting solidification product was confirmed to surpass the evaluation standard value fully. When naphthalenesulfonic acid formaldehyde or phosphate glass was added in a proportion of 0.5% or more to cement, the solidifying material was confirmed to gain a viscosity which enabled in-drum mixing.

TABLE 7

Influence of type of chemical admixture

| Type of chemical admixture | Amount of chemical admixture added (wt %) | Na/B (molar ratio) | Ca/B (molar ratio) | Viscosity of kneaded product (dPa·s)* | Uniaxial compressive strength (MPa)** |
|---|---|---|---|---|---|
| Phosphate glass | 0.5 | 0.2 | 0.6 | 20 | 5 |
| Potassium carbonate | 0.5 | 0.2 | 0.6 | 35 | 5 |
| Lignin sulfonic acid | 0.5 | 0.2 | 0.6 | 15 | 5 |
| Naphthalene-sulfonic acid formaldehyde | 0.5 | 0.2 | 0.6 | 18 | 5 |
| carboxylic acid | 0.5 | 0.2 | 0.6 | 10 | 5 |

*Evaluation standard value: 50 dPa·s or less
**Evaluation Standard value: 1.5 MPa or more The invention can provide a method and an apparatus for treating a boron-containing powder which improve feedability of a boron-containing waste liquid to a dryer, realize in-drum mixing of a dry powder and a cementitious solidifying material when kneaded, increase the strength of a cement solidification product, and achieve a marked reduction in the volume of the solidification product.

As an example, the invention can provide an apparatus for treating radioactive waste in a process in which a concentrated waste liquid consisting essentially of boric acid occurring in a nuclear power plant or the like is insolubilized by formation of borate and dried. The apparatus is capable of lowering the sedimentation velocity of an insoluble borate in the waste liquid, and is highly reliable in preventing clogging of a waste liquid line. The invention can also convert such a boric acid-containing waste liquid into a stable, firm, solidification product of radioactive waste. Besides, the invention can simplify the instruments of radioactive waste disposal equipment and downscale the facilities, thus reducing costs involved in radioactive waste treatment.

What is claimed is:

1. A method for treating a boron-containing waste liquid, comprising the steps of:

adding an alkali metal element compound and an alkaline earth metal element compound to the boron-containing waste liquid;

drying and powdering the boron-containing waste liquid to obtain a waste powder; and kneading and solidifying the thus obtained waste powder with a cementitious solidifying material, a chemical admixture for improving fluidity of cement and water, thereby obtaining a solidification product of waste, wherein the temperature of the boron-containing waste liquid during a period from the addition of either the alkali metal element compound or the alkaline earth metal element compound until the drying and powderization is maintained not lower than a precipitation temperature of a compound containing boron and an alkali metal and a compound containing boron and an alkaline earth metal.

2. A method for treating a boron-containing waste liquid as claimed in claim 1, wherein the boron-containing waste liquid is a boric acid-containing waste liquid generated in radioactive substance handling facilities, the temperature of the waste liquid is 60° C. or higher, and the drying and powdering are performed in a dryer.

3. A method for treating a boron-containing waste liquid as claimed in claim 1, wherein in the boron-containing waste liquid, the proportion of the alkali metal element compound is 0.2 or higher when expressed as a molar ratio to boron, and the proportion of the alkaline earth metal element compound is 0.2 to 0.8 when expressed as a molar ratio to boron.

4. A method for treating a boron-containing waste liquid as claimed in claim 1, wherein in the boron-containing waste liquid, the proportion of the alkali metal element compound is 0.2 to 0.5 when expressed as a molar ratio to boron, and the proportion of the alkali earth metal compound is 0.2 to 0.7 when expressed as a molar ratio to boron.

5. A method for treating a boron-containing waste liquid as claimed in claim 1, wherein the alkali metal element compound is added and dissolved, and then the alkaline earth metal element compound is added and dissolved.

6. A method for treating a boron-containing waste liquid as claimed in claim 1, wherein the cementitious solidify material, the chemical admixture for improving fluidity of cement, and the water are kneaded in a waste storage container to prepare a cement slurry, the waste powder containing boron, the alkali metal element compound and the alkaline earth metal element compound is charged into the cement slurry, and then the cement is solidified.

7. A method for treating a boron-containing waste liquid as claimed in claim 1, wherein the chemical admixture and the cementitious solidifying material are mixed beforehand, and then the kneading is performed.

8. A method for treating a boron-containing waste liquid as claimed in claim 1, wherein the waste powder containing boron, the alkali metal element compound and the alkaline earth metal element compound is charged into a measuring container to measure the weight of the waste powder, and then the waste powder is moved into a waste solidifying container.

9. A method for treating a boron-containing waste liquid as claimed in claim 1, wherein the waste powder containing boron, the alkali metal element compound and the alkaline earth metal element compound is charged into a waste storage container, and the weight of the container is measured, whereby the weight of the waste powder is measured.

10. A method for treating a boron-containing waste liquid as claimed in claim 1, wherein the cementitious solidifying material in an amount necessary for solidification is supplied beforehand into a waste storage container from a cementitious solidifying material silo installed in relevant radioactive waste disposal equipment.

11. A method for treating a boron-containing waste liquid as claimed in claim 1, wherein the cementitious solidifying material in a waste storage container is weighed in facilities other than relevant radioactive waste disposal equipment, and then brought into relevant radioactive waste disposal facilities.

12. A method for treating a boron-containing waste liquid, comprising:

(a) adding an alkali metal element compound and an alkaline earth metal element compound to the boron-containing waste liquid;

(b) drying and powdering the boron-containing waste liquid to obtain a waste powder; and (c) maintaining a temperature of the boron-containing waste liquid above a precipitation temperature of a compound containing boron and an alkali metal element and a compound containing boron and an alkaline earth metal element, during a period from the addition of either the alkali metal element compound or the alkaline earth metal element compound until said drying and powdering.

* * * * *